US011948724B2

(12) United States Patent
Hanson et al.

(10) Patent No.: US 11,948,724 B2
(45) Date of Patent: Apr. 2, 2024

(54) METHOD FOR MAKING A MULTI-THICKNESS ELECTRO-MAGNETIC DEVICE

(71) Applicant: VISHAY DALE ELECTRONICS, LLC, Columbus, NE (US)

(72) Inventors: Benjamin Hanson, Yankton, SD (US); Rodney Brune, Columbus, NE (US); Matt Huber, Yankton, SD (US)

(73) Assignee: VISHAY DALE ELECTRONICS, LLC, Columbus, NE (US)

(*) Notice: Subject to any disclaimer, the term of this patent is extended or adjusted under 35 U.S.C. 154(b) by 0 days.

(21) Appl. No.: 17/351,782

(22) Filed: Jun. 18, 2021

(65) Prior Publication Data

US 2022/0406517 A1 Dec. 22, 2022

(51) Int. Cl.

| | |
|---|---|
| ***H01F 7/06*** | (2006.01) |
| ***H01F 27/28*** | (2006.01) |
| ***H01F 41/02*** | (2006.01) |
| ***H01F 41/04*** | (2006.01) |

(52) U.S. Cl.

CPC ..... *H01F 27/2852* (2013.01); *H01F 41/0246* (2013.01); *H01F 41/04* (2013.01)

(58) Field of Classification Search

CPC ... H01F 27/2852; H01F 41/0246; H01F 41/04

See application file for complete search history.

(56) References Cited

U.S. PATENT DOCUMENTS

| | | | | |
|---|---|---|---|---|
| 2,497,516 A | | 2/1950 | Phelps | |
| 2,889,525 A | | 6/1959 | Smith | |
| 3,169,234 A | | 2/1965 | Renskers | |
| 3,545,249 A | * | 12/1970 | Brown .................. | B21D 22/04 72/355.2 |

(Continued)

FOREIGN PATENT DOCUMENTS

| | | |
|---|---|---|
| CN | 1059231 | 3/1992 |
| CN | 1677581 | 10/2005 |

(Continued)

OTHER PUBLICATIONS

SMD Shielded Power Inductors—BPMV Series. Chilisin Electronics Corp. Mar. 2, 2020. 11 pp.

(Continued)

*Primary Examiner* — Paul D Kim
(74) *Attorney, Agent, or Firm* — Volpe Koenig

(57) ABSTRACT

Electro-magnetic devices are provided, having conductive elements and leads of multiple thicknesses. Templates are provided for making electro-magnetic devices, formed by an extrusion process, a skiving process, a swaging process, 3D printing, or a machining process. The multi-thickness electro-magnetic devices may comprise a conductive element having an increased thickness area, and one or more leads having at least one decreased thickness area, having a thickness less than the increased thickness area. An electro-magnetic device may be provided comprising a conductive element having an increased thickness encased in a body formed from a core material, and leads or lead portions connected to the conductive element having a decreased thickness.

19 Claims, 13 Drawing Sheets

(56) References Cited

U.S. PATENT DOCUMENTS 3,638,597 A * 2/1972 Brown ................. B21D 51/383
29/509
3,958,328 A 5/1976 Lee
4,180,450 A 12/1979 Morrison
4,223,360 A 9/1980 Sansom et al.
4,413,161 A 11/1983 Matsumoto
4,901,048 A 2/1990 Williamson
5,010,314 A 4/1991 Estrov
5,126,715 A 6/1992 Yerman
5,245,307 A 9/1993 Klaus
5,451,914 A 9/1995 Stengel
5,481,238 A 1/1996 Carsten
5,515,022 A 5/1996 Tashiro et al.
5,773,886 A 6/1998 Rostoker
5,801,432 A 9/1998 Rostoker
5,821,624 A 10/1998 Pasch
5,844,451 A 12/1998 Murphy
5,888,848 A 3/1999 Cozar
5,912,609 A 6/1999 Usui
5,913,551 A 6/1999 Tsutsumi
5,917,396 A 6/1999 Halser, III
5,949,321 A 9/1999 Grandmont
6,026,311 A 2/2000 Willemsen Cortes
6,060,976 A 5/2000 Yamaguchi
6,078,502 A 6/2000 Rostoker
6,081,416 A 6/2000 Trinh
6,087,922 A 7/2000 Smith
6,204,744 B1 3/2001 Shafer
6,222,437 B1 4/2001 Soto
6,236,297 B1 5/2001 Chou
6,255,725 B1 7/2001 Akagawa
6,317,965 B1 11/2001 Okamoto
6,326,739 B1 12/2001 MacLennan
6,351,033 B1 2/2002 Lotfi
6,392,525 B1 5/2002 Kato
6,409,859 B1 6/2002 Chung
6,438,000 B1 8/2002 Okamoto
6,456,184 B1 9/2002 Vu
6,460,244 B1 10/2002 Shafer
6,476,689 B1 11/2002 Uchida
6,546,184 B2 4/2003 Kamiya
6,713,162 B2 3/2004 Takaya
6,723,775 B2 4/2004 Lau
6,734,074 B2 5/2004 Chen
6,765,284 B2 7/2004 Gibson
6,774,757 B2 8/2004 Fujiyoshi
6,869,238 B2 3/2005 Ishiguro
6,879,235 B2 4/2005 Ichikawa
6,879,238 B2 4/2005 Liu
6,882,261 B2 4/2005 Moro
6,888,435 B2 5/2005 Inoue
6,933,895 B2 8/2005 Mendolia
6,940,154 B2 9/2005 Pedron
6,965,517 B2 11/2005 Wanes
6,998,952 B2 2/2006 Zhou
7,023,313 B2 4/2006 Sutardja
7,034,645 B2 4/2006 Shafer
7,046,492 B2 5/2006 Fromm
7,126,443 B2 10/2006 De Bhailis
7,176,506 B2 2/2007 Beroz
7,192,809 B2 3/2007 Abbott
7,218,197 B2 5/2007 Sutardja
7,221,251 B2 5/2007 Menegoli
7,289,013 B2 10/2007 DeCristofaro
7,289,329 B2 10/2007 Chen
7,292,128 B2 11/2007 Hanley
7,294,587 B2 11/2007 Asahi
7,295,448 B2 11/2007 Zhu
7,307,502 B2 12/2007 Sutardja
7,317,373 B2 1/2008 Hsu
7,339,451 B2 3/2008 Liu
7,345,562 B2 3/2008 Shafer
7,392,581 B2 7/2008 Sano
7,456,722 B1 11/2008 Eaton
7,460,002 B2 12/2008 Estrov
7,469,469 B2 12/2008 Nakata
7,489,219 B2 2/2009 Satardja
7,540,747 B2 6/2009 Ice
7,541,908 B2 6/2009 Kitahara
7,545,026 B2 6/2009 Six
7,567,163 B2 7/2009 Dadafshar
7,629,860 B2 12/2009 Liu
7,667,565 B2 2/2010 Liu
7,675,396 B2 3/2010 Liu
7,705,418 B2 4/2010 Kono
7,705,508 B2 4/2010 Dooley
7,736,951 B2 6/2010 Prajuckamol
7,786,834 B2 8/2010 Yagasaki
7,791,445 B2 9/2010 Manoukian
7,825,502 B2 11/2010 Irving
7,849,586 B2 12/2010 Sutardja
7,868,725 B2 1/2011 Sutardja
7,872,350 B2 1/2011 Otremba
7,882,614 B2 2/2011 Sutardja
7,915,993 B2 3/2011 Liu
7,920,043 B2 4/2011 Nakagawa
7,987,580 B2 8/2011 Sutardja
7,999,650 B2 8/2011 Mori
8,028,401 B2 10/2011 Sutardja
8,035,471 B2 10/2011 Sutardja
8,049,588 B2 11/2011 Shibuya
8,080,865 B2 12/2011 Harvey
8,097,934 B1 1/2012 Li
8,098,123 B2 1/2012 Sutardja
8,164,408 B2 4/2012 Kim
8,279,037 B2 10/2012 Yan
8,310,332 B2 11/2012 Yan
8,350,659 B2 1/2013 Dziubek
8,378,777 B2 2/2013 Yan
8,466,764 B2 6/2013 Bogert
8,484,829 B2 7/2013 Manoukian
8,659,379 B2 2/2014 Yan
8,695,209 B2 4/2014 Saito
8,698,587 B2 4/2014 Park
8,707,547 B2 4/2014 Lee
8,910,369 B2 12/2014 Herbsommer
8,910,373 B2 12/2014 Yan
8,916,408 B2 12/2014 Huckabee
8,916,421 B2 12/2014 Gong
8,927,342 B2 1/2015 Goesele
8,941,457 B2 1/2015 Yan
8,998,454 B2 4/2015 Wang
9,001,524 B1 4/2015 Akre
9,029,741 B2 5/2015 Montoya
9,141,157 B2 9/2015 Mohd Arshad
9,142,345 B2 9/2015 Chen
9,177,945 B2 11/2015 Saye
9,190,389 B2 11/2015 Meyer-Berg
9,276,339 B2 3/2016 Rathburn
9,318,251 B2 4/2016 Klesyk
9,368,423 B2 6/2016 Do
9,373,567 B2 6/2016 Tan
9,614,423 B2 4/2017 Weller
9,679,694 B2 6/2017 Kitami
9,978,506 B2 5/2018 Ohtsubo
10,002,706 B2 6/2018 Dien
10,109,409 B2 10/2018 Lee
10,332,667 B2 6/2019 Jeong
10,546,684 B2 1/2020 Huang
10,796,842 B2 10/2020 Huang
10,854,367 B2 * 12/2020 Hanson .................. H01F 41/04
2002/0011914 A1 1/2002 Ikeura
2002/0040077 A1 4/2002 Hanejko
2002/0130752 A1 9/2002 Kuroshima
2002/0158739 A1 10/2002 Shibata
2003/0016112 A1 1/2003 Brocchi
2003/0141952 A1 7/2003 Moro
2003/0178694 A1 9/2003 Lemaire
2004/0017276 A1 1/2004 Chen
2004/0061584 A1 4/2004 Darmann
2004/0100347 A1 5/2004 Okamoto
2004/0232982 A1 11/2004 Ichitsubo
2004/0245232 A1 12/2004 Ihde
2005/0012581 A1 1/2005 Ono

(56) References Cited

U.S. PATENT DOCUMENTS

| | | | |
|---|---|---|---|
| 2005/0030141 | A1 | 2/2005 | Barber |
| 2005/0188529 | A1 | 9/2005 | Uriu et al. |
| 2005/0273938 | A1 | 12/2005 | Metzger |
| 2006/0001517 | A1 | 1/2006 | Cheng |
| 2006/0038653 | A1 | 2/2006 | Cheng |
| 2006/0113645 | A1 | 6/2006 | Warner |
| 2006/0132272 | A1 | 6/2006 | Kitahara |
| 2007/0052510 | A1 | 3/2007 | Saegusa |
| 2007/0166554 | A1 | 7/2007 | Ruchert |
| 2007/0186407 | A1 | 8/2007 | Shafer |
| 2007/0247268 | A1 | 10/2007 | Oya |
| 2007/0252669 | A1 | 11/2007 | Hansen |
| 2007/0257759 | A1 | 11/2007 | Lee |
| 2008/0029879 | A1 | 2/2008 | Tuckerman |
| 2008/0110014 | A1 | 5/2008 | Shafer et al. |
| 2008/0150670 | A1 | 6/2008 | Chung |
| 2008/0303606 | A1 | 12/2008 | Liu |
| 2009/0057822 | A1 | 3/2009 | Wen |
| 2009/0115562 | A1 | 5/2009 | Lee |
| 2009/0115563 | A1 | 5/2009 | Arata et al. |
| 2010/0007452 | A1 | 1/2010 | Forsberg |
| 2010/0007453 | A1 | 1/2010 | Yan |
| 2010/0060401 | A1 | 3/2010 | Tai |
| 2010/0097171 | A1 | 4/2010 | Urata |
| 2010/0123541 | A1 | 5/2010 | Saka |
| 2010/0171579 | A1 | 7/2010 | Yan |
| 2010/0271161 | A1 | 10/2010 | Yan |
| 2010/0314728 | A1 | 12/2010 | Li |
| 2010/0328003 | A1 | 12/2010 | Shibuya |
| 2011/0100527 | A1 | 5/2011 | Tatsukawa et al. |
| 2011/0227690 | A1 | 9/2011 | Watanabe |
| 2011/0260825 | A1 | 10/2011 | Doljack |
| 2011/0273257 | A1 | 11/2011 | Ishizawa |
| 2012/0049334 | A1 | 3/2012 | Pagaila |
| 2012/0176214 | A1 | 7/2012 | Hsiao |
| 2012/0216392 | A1 | 8/2012 | Fan |
| 2012/0273932 | A1 | 11/2012 | Mao |
| 2013/0015939 | A1 | 1/2013 | Inagaki |
| 2013/0081267 | A1 | 4/2013 | Hall et al. |
| 2013/0181803 | A1 | 7/2013 | Wyville |
| 2013/0249546 | A1 | 9/2013 | David |
| 2013/0273692 | A1 | 10/2013 | McMillan |
| 2013/0278571 | A1 | 10/2013 | Ahn |
| 2013/0307117 | A1 | 11/2013 | Koduri |
| 2014/0008974 | A1 | 1/2014 | Miyamoto |
| 2014/0125441 | A1 | 5/2014 | Hongping |
| 2014/0210062 | A1 | 7/2014 | Miyazaki |
| 2014/0210584 | A1 | 7/2014 | Blow |
| 2014/0302718 | A1 | 10/2014 | Gailus |
| 2014/0313003 | A1 | 10/2014 | Liu |
| 2014/0320124 | A1 | 10/2014 | David |
| 2014/0340186 | A1 | 11/2014 | Xianfeng |
| 2014/0361423 | A1 | 12/2014 | Chi |
| 2015/0214198 | A1 | 7/2015 | Lee |
| 2015/0263576 | A1 | 9/2015 | Kato |
| 2015/0270860 | A1 | 9/2015 | McCain |
| 2016/0069545 | A1 | 3/2016 | Chien |
| 2016/0073509 | A1 | 3/2016 | Zhang |
| 2016/0099189 | A1 | 4/2016 | Yen |
| 2016/0133373 | A1 | 5/2016 | Orr |
| 2016/0181001 | A1 | 6/2016 | Doljack |
| 2016/0190918 | A1 | 6/2016 | Ho |
| 2016/0217914 | A1 | 7/2016 | Kim |
| 2016/0217922 | A1 | 7/2016 | Sherrer |
| 2017/0309394 | A1 | 10/2017 | Blow |
| 2018/0061547 | A1 | 3/2018 | Hanson |
| 2018/0137969 | A1 | 5/2018 | Hamamura |
| 2018/0175136 | A1 | 6/2018 | Hijioka et al. |
| 2019/0244745 | A1 | 8/2019 | Kojima |
| 2019/0311831 | A1 | 10/2019 | Yeo |
| 2020/0035413 | A1 | 1/2020 | Hanson et al. |
| 2021/0193360 | A1 | 6/2021 | Hanson et al. |

FOREIGN PATENT DOCUMENTS

| | | |
|---|---|---|
| CN | 101578671 | 11/2009 |
| CN | 102044327 | 5/2011 |
| CN | 102376438 | 3/2012 |
| CN | 102822913 | 12/2012 |
| CN | 103680861 | 3/2014 |
| CN | 104247220 | 12/2014 |
| CN | 104685587 | 6/2015 |
| CN | 207558566 | 6/2018 |
| CN | 208596597 | 3/2019 |
| CN | 208706396 | 4/2019 |
| CN | 109754986 | 5/2019 |
| CN | 209388809 | 9/2019 |
| EP | 0 606 973 | 7/1994 |
| EP | 0606973 | 7/1994 |
| EP | 0662699 | 5/1998 |
| EP | 1 933 340 | 6/2008 |
| EP | 1 091 369 | 11/2011 |
| EP | 2 518 740 | 10/2012 |
| GB | 1 071 469 | 6/1967 |
| JP | 04059396 | 12/1899 |
| JP | 02-036013 | 3/1990 |
| JP | 03-171793 | 7/1991 |
| JP | H03171703 | 7/1991 |
| JP | H04129206 | 11/1992 |
| JP | H05 258959 | 10/1993 |
| JP | H06 55211 | 7/1994 |
| JP | H06 283338 | 10/1994 |
| JP | H07-245217 | 9/1995 |
| JP | 07-273292 | 10/1995 |
| JP | H09-306757 | 11/1997 |
| JP | H11340060 | 12/1999 |
| JP | 2000021656 | 1/2000 |
| JP | 2000091133 | 3/2000 |
| JP | 2000323336 | 11/2000 |
| JP | 2003309024 | 10/2003 |
| JP | 2004022814 | 1/2004 |
| JP | 2004087607 | 3/2004 |
| JP | 2004266120 | 9/2004 |
| JP | 2005109290 | 4/2005 |
| JP | 2005310865 | 11/2005 |
| JP | 2006505142 | 2/2006 |
| JP | 2009224815 | 10/2009 |
| JP | 2011054811 | 3/2011 |
| JP | 4768383 | 9/2011 |
| JP | 2012-104724 | 5/2012 |
| JP | 2012195399 | 10/2012 |
| JP | 2017220573 | 12/2017 |
| JP | 2018098312 | 6/2018 |
| JP | 6681544 | 4/2020 |
| KR | 20180071644 | 6/2018 |
| TW | I299504 | 8/2008 |
| TW | 201616529 | 5/2016 |
| WO | 2010/129352 | 11/2010 |

OTHER PUBLICATIONS

Chilisin Electronics Corp. BPMV00070795R20K2F Inductor. 2018. 2 pp.

SMD Power Inductors—BPSG/BPSW Series. Chilisin Electronics Corp. Mar. 2, 2020. 4 pp.

Cutress, Ian. Gigabyte Server GA-7PESH3 Motherboard Review. Anandtech. Sep. 4, 2014.

FP1108R, High frequency, high current power inductors. Technical Data 10227. Sep. 2017. 4 pp.

International Search Report and Written Opinion of the International Searching Authority dated Sep. 21, 2022.

* cited by examiner

METHOD FOR MAKING A MULTI-THICKNESS ELECTRO-MAGNETIC DEVICE

FIELD OF INVENTION

This application relates to the field of electronic components, and more specifically, to electro-magnetic devices having multi-thickness elements, such as conductive elements and leads, for devices such as inductors, and methods of manufacturing multi-thickness electro-magnetic devices, and electro-magnetic devices formed using multi-thickness templates as described herein.

BACKGROUND

Electro-magnetic devices, such as inductors are, generally, passive two-terminal electronic components. An inductor generally includes a conductor, such as a wire, wound into a coil. When current flows through the coil, energy is stored temporarily in a magnetic field in the coil. When the current flowing through an inductor changes, the time-varying magnetic field induces a voltage in the conductor, according to Faraday's law of electromagnetic induction.

Some known inductors are generally formed having a core body of magnetic material, with a conductor such as a wound coil positioned internally, at times with the conductor formed as a wound coil. Examples of known inductors include U.S. Pat. No. 6,198,375 ("Inductor coil structure") and U.S. Pat. No. 6,204,744 ("High current, low profile inductor"), the entire contents of which are incorporated by reference herein.

Often, it is necessary to form, set or adjust the performance characteristics of an electro-magnetic device by changing the characteristics or parameters of the certain elements, such as the wire or coil. Many electro-magnetic devices use a wound coil formed from a conductive material. The characteristics of such devices may be adjusted such as by increasing the number of turns of such a coil, thereby increasing the number of coil windings. This arrangement therefore requires special machinery and careful adjustment.

Designs of electro-magnetic devices requiring coils formed as laminated layers or folded layers require additional machining and adjustments. Designs requiring soldering different pieces together may require additional machining and adjustments and have weaknesses.

Designs of electro-magnetic devices having thicker lead portions have the potential to crack a core body surrounding the leads when the leads are bent around the core body.

A need exists for a simple and cost-effective way to produce consistent electro-magnetic devices, such as inductors, having decreased direct current resistance (DCR).

A further need exists for manufacturing an electro-magnetic device such as an inductor, where the electro-magnetic device is formed in such as manner as to provide for improved performance.

A further need exists for manufacturing an electro-magnetic device such as an inductor where a conductive element, such as for example a coil or wire, that can have a varied size but is not wound or formed from a wound piece of wire.

SUMMARY

Electro-magnetic devices having multi-thickness conductive elements and leads, and methods of making, forming or otherwise manufacturing multi-thickness electro-magnetic devices, are disclosed herein.

As used herein, the term "multi-thickness" may refer to having more than one thickness, at least two different thicknesses, multiple thicknesses, varied thickness, or a plurality of different thicknesses. In some aspects, the thickness may be measured along the length, width, or height, depending on the orientation of the electro-magnetic device or lead frame. As used herein, the term "multi-thickness electro-magnetic device" refers to an electro-magnetic device having a coil, conductor or conductive element and one or more leads, wherein the coil, conductor or conductive element and the one or more leads have a varied thickness, or different thicknesses, as described in greater detail herein. For example, the coil, conductor or conductive element may have a first thickness, one of the leads may have a second thickness, and another one of the leads may have a third thickness, and the first thickness differs from the second thickness, and/or the first thickness differs from the third thickness.

An according to an aspect of the invention, an electro-magnetic device comprises a conductive element formed from a conductive material connected to a first lead and a second lead. The conductive element has a first thickness, the first lead has a second thickness, and the second lead has a third thickness. The first thickness may differ from the second thickness. The first thickness may differ from the third thickness. The first thickness may be greater than the second thickness. The first thickness may be greater than the third thickness. The conductive element may take various shapes.

A method for making an electro-magnetic device according to an aspect of the invention comprises the steps of: providing a conductive material; and forming the conductive material into a conductive element having a first thickness, a first lead portion having a second thickness, and a second lead portion comprising a third thickness, wherein the first thickness is greater than the second thickness, and wherein the first thickness is greater than the third thickness. The method may further optionally comprise pressing a body around the conductive element and at least a portion of the first lead and at least a portion of the second lead.

A method for making a template for forming a multi-thickness electro-magnetic device according to an aspect of the invention comprises the steps of: providing a conductive material; and forming the conductive material into a multi-thickness template, the multi-thickness template comprising a conductive element having a first thickness, a first lead portion having a second thickness, and a second lead portion comprising a third thickness, wherein the first thickness is greater than the second thickness, and wherein the first thickness is greater than the second thickness. The template may take the form of a lead frame.

According to an aspect of the invention, a method for making a template for a multi-thickness electro-magnetic device is provided. The method may comprise extruding a conductive material into a multi-thickness metal extrusion or sheet having areas with varied thicknesses or heights. The extruded conductive material is a single, continuous, contiguous or unitary piece of a conductive material, such as a conductive metal. Preferably, an increased thickness area such as a generally central area of the extruded conductive material has a greater thickness than the outer or side areas or portions of the extruded conductive material and/or the leads. The multi-thickness extruded conductive material may be plated such as with nickel as a first layer and tin as a second or outer layer. The multi-thickness extruded conductive material is stamped forming the desired shape of a multi-thickness template having a conductive element connected to a first lead and a second lead. The stamped multi-thickness template therefore comprises shaped areas, which may be considered a coil, coil area or wire area, and that may be referred to generally as a "conductive element." The conductive element is formed in a generally increased thickness area of the template at a central or inner area of the template. The conductive element, first lead, and second lead are all formed from a single, continuous, contiguous or unitary piece of conductive material.

In another aspect of the invention a method for making a multi-thickness template for an electro-magnetic device is provided. The method comprises providing a metal plate or sheet or strip of a conductive material that begins with a uniform thickness or height. The conductive material is a single, continuous, contiguous or unitary piece of a conductive material. The conductive material undergoes a metal skiving or cutting process using a cutting tool having surfaces of various dimensions, such as a blade having a cutting surface at a first height and at least one non-cutting surface at a second lesser height, to produce multi-thickness metal sheet. The conductive material may be plated such as with nickel as a first layer and tin as a second or outer layer. The conductive material is stamped forming the desired shape of a template having a conductive element connected to a first lead and a second lead. The conductive element, which is associated with the increased thickness area of the multi-thickness template, has a greater thickness than the outer or side areas of the multi-thickness template and/or the leads.

In another aspect of the invention a method for making a multi-thickness template for an electro-magnetic device is provided. The method comprises providing a metal plate or sheet or strip of a conductive material that begins with a uniform thickness or height. The conductive material is a single, continuous, contiguous or unitary piece of a conductive material such as a metal sheet. The conductive material may be plated such as with nickel as a first layer and tin as a second or outer layer. The conductive material is stamped to produce a template comprising a conductive element of a desired shape, and leads extending from the conductive element. To produce a multi-thickness template with a conductive element having a greater thickness than the outer or side areas of the conductive material and/or the leads, selected outer areas of the template, which may comprise the leads, are flattened such as by swaging or pressing. In this manner, the selected outer areas have a decreased thickness or height as compared to the thickness or height of the conductive element.

In an aspect of the invention, the conductive element has a reduced thickness as compared to the thickness of the first lead, and/or as compared to the thickness of the second lead. In such an aspect of the invention, similar methods to those described can be performed, with the conductive element having a reduced thickness, and the first lead or the second lead having an increased thickness as compared to the thickness of the conductive element.

In an aspect of the invention, electro-magnetic devices may be formed using the templates disclosed herein.

In an aspect of the invention, an electro-magnetic device may be formed having only a conductive element and lead portions of different thicknesses, without any additional core body or core materials forming a body about the conductive element or lead portions.

Electro-magnetic devices according to an aspect of the invention may comprise a compressed and/or molded powder core or body or core body formed from, for example, a magnetic powder compressed and/or molded around the conductive element and portions of the conductive element such as portions of the leads adjacent the conductive element. The leads may then be positioned and bent to wrap around outer surfaces of the body to form contact points at one external surface of the body. Preferably, portions of the leads are positioned along bottom surfaces of the body to form surface mount leads. In other aspects, the leads are not bent in such a manner.

The conductive material may be formed as a conductive element having a specific shape, such as a serpentine or meandering shape, and may be formed having an "S" shape, or another shape having bent or curved areas, such as circular shape, an ellipsoid shape, or an Omega (Ω) shape. The conductive element may be formed having a selected shape, such as a generally or beam rectangular shape, an "I" shape or "H" shape, a "barbell" shape, or another selected shape. A body of the electro-magnetic device surrounds the conductive element, and may be pressed around the conductive element, leaving the leads extended from a surface or surfaces the body.

It is noted that the conductive element of the present invention is formed without the need to wind or provide multiple layers of a wire or coil. Aspects of the present invention provide for a non-wound, conductive element having a shape with an increased thickness or height area that is formed as a unitary piece along with the attached leads by extruding, stamping, pressing, and/or cutting a sheet of metal. There are preferably no interruptions or breaks formed in the conductive element along the path from one lead, along the conductive element, to another lead. The conductive element is not wound and does not have any portions passing over or under or crossing over or under another portion of the conductive element.

It is appreciated that other conductive materials as are known in the art, such as other materials used for coils or conductive elements in electro-magnetic devices, may also be used without departing from the teachings of the present invention. Insulation may also be used around or between parts of the conductive element and/or leads if needed for particular applications.

The lead portions may be aligned along a generally straight path or lie generally along the same plane and may have a selected height and width.

The leads and conductive element may be formed at the same time during the manufacturing process. The conductive element does not have to be joined, such as by welding, to the leads.

By applying the teachings described herein, an electro-magnetic device may be formed having multiple conductive material thicknesses provided in a single, continuous or uniform piece.

The increased thickness coil area or conductive element functions in part to decrease the direct current resistance (DCR) of the inductor.

The decreased thickness on the outside portions (such as the lead portions) provide for easier forming of the leads. Further, the lead portions formed according to aspects of the invention increase the solderable surface area of the lead portions, and further increase the shock and vibration performance by improving the mounting stability of the component. In addition, the lead portions as formed improve the heat transfer between the electro-magnetic device and a circuit board or such as a printed circuit board (PCB) to which the device is mounted.

BRIEF DESCRIPTION OF THE DRAWING(S)

The foregoing aspects and many of the accompanying advantages of this invention will become more readily appreciated as the same becomes better understood by reference to the following detailed description when taken in conjunction with the accompanying drawings, wherein.

Figure 10:
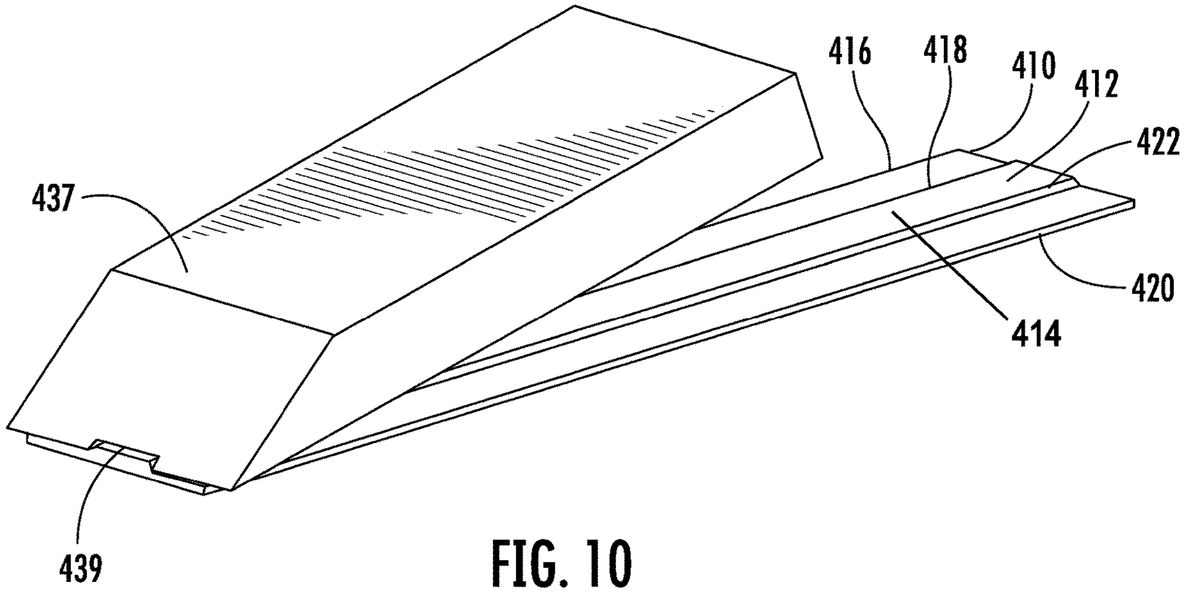
Figure 11:
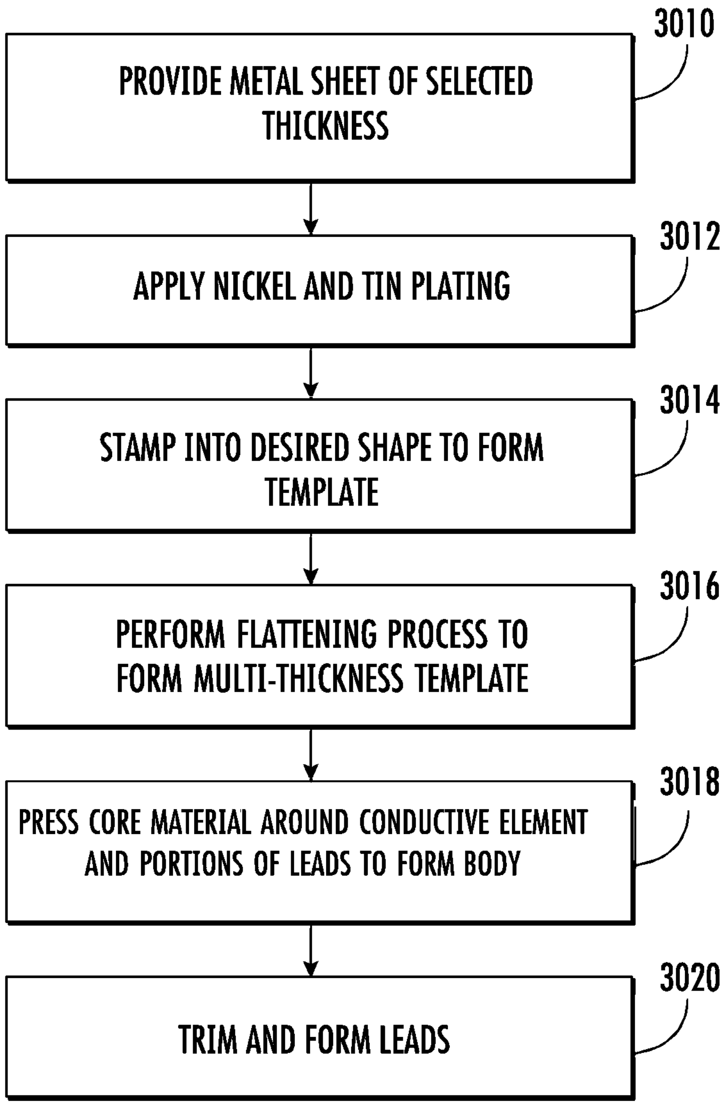
Figure 12:
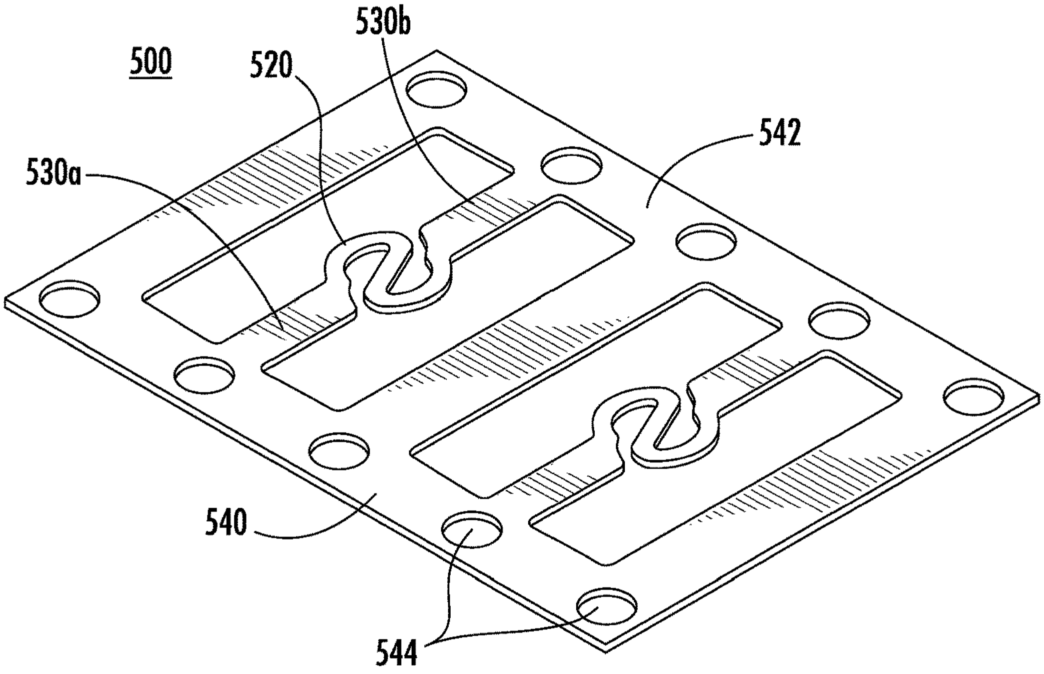
Figure 13:
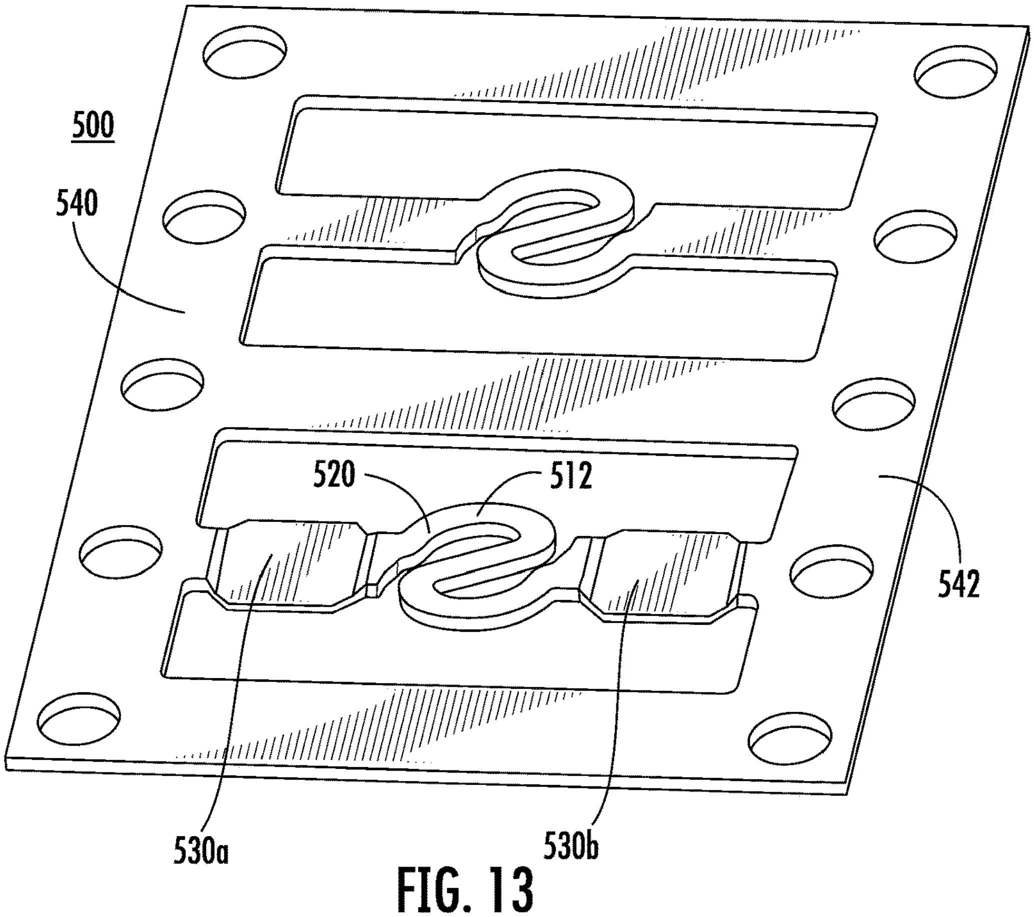
Figure 14:
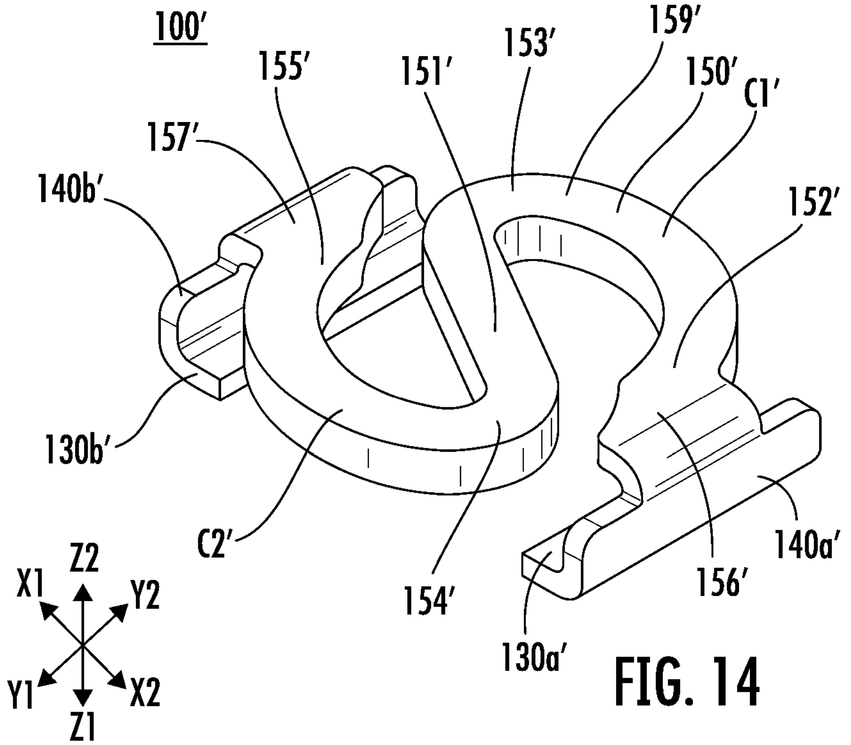
Figure 15:
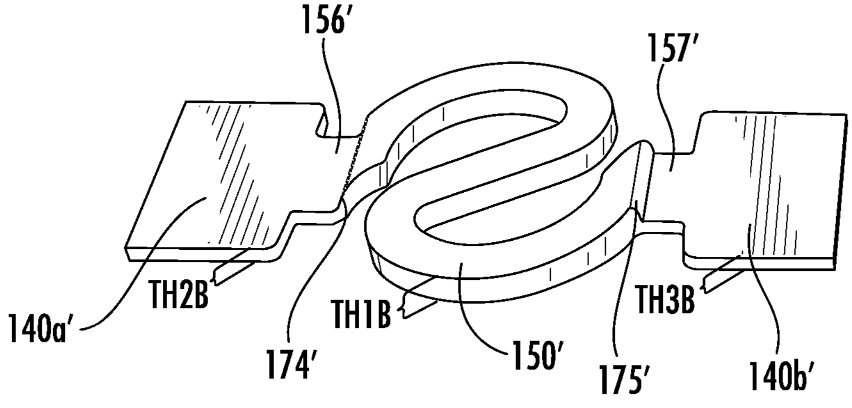
Figure 16:
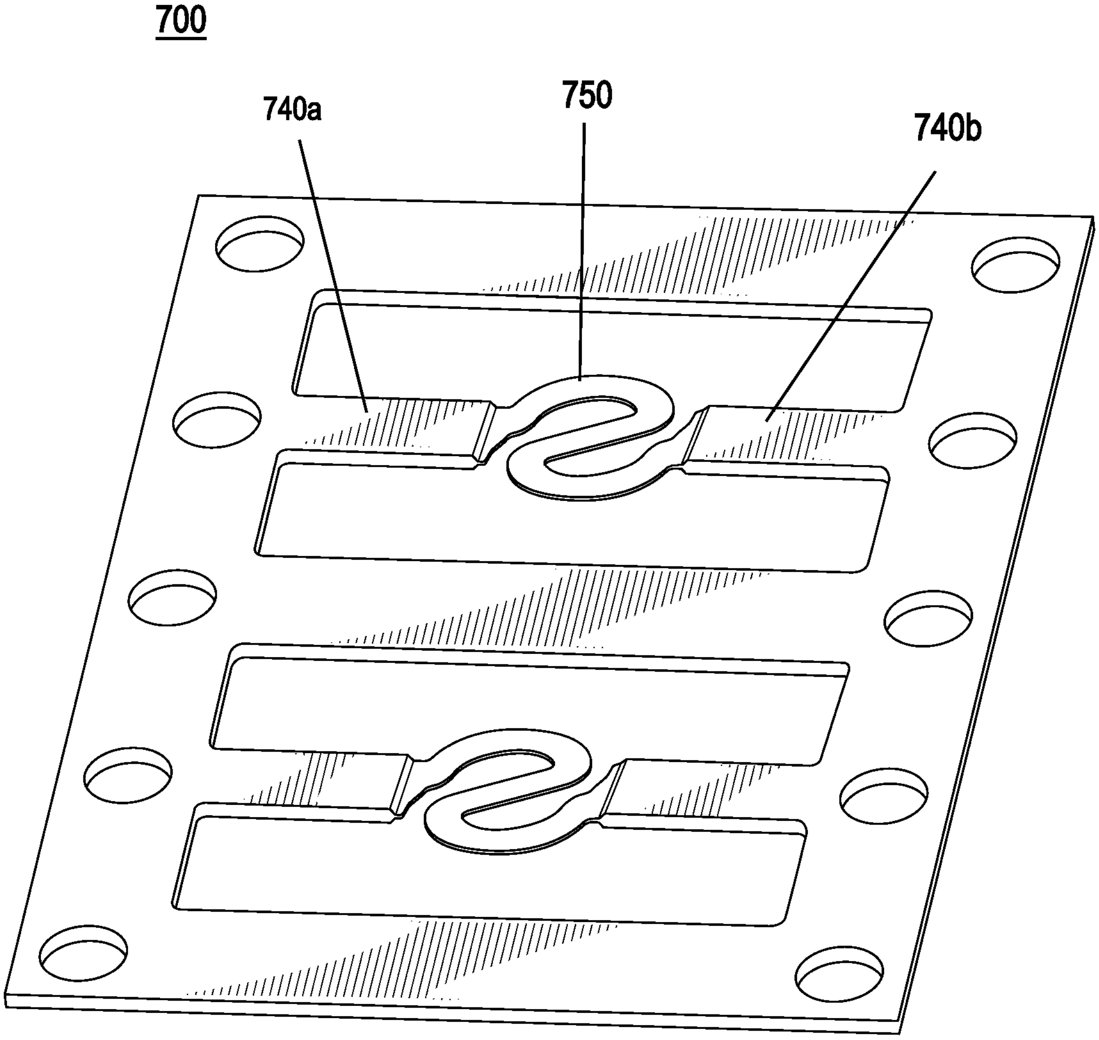

FIG. 10 illustrated a blade performing a skiving process on a metal sheet to form a multi-thickness metal sheet;

FIG. 11 shows a flowchart illustrating a method of making a multi-thickness template and electro-magnetic device according to an aspect of the invention;

FIG. 12 illustrates a template according to an aspect of the invention;

FIG. 13 illustrates a detailed view of a multi-thickness template according to an aspect of the invention, having flattened lead portions;

FIG. 14 illustrates an isometric view of an electro-magnetic device according to an aspect of the invention;

FIG. 15 illustrates an isometric view of an electro-magnetic device or template according to an aspect of the invention; and FIG. 16 illustrates a template according to an aspect of the invention.

DETAILED DESCRIPTION

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof. It may be noted that some Figures are shown with partial transparency for the purpose of explanation, illustration and demonstration purposes only, and is not intended to indicate that an element itself would be transparent in its final manufactured form.

Figure 1A:
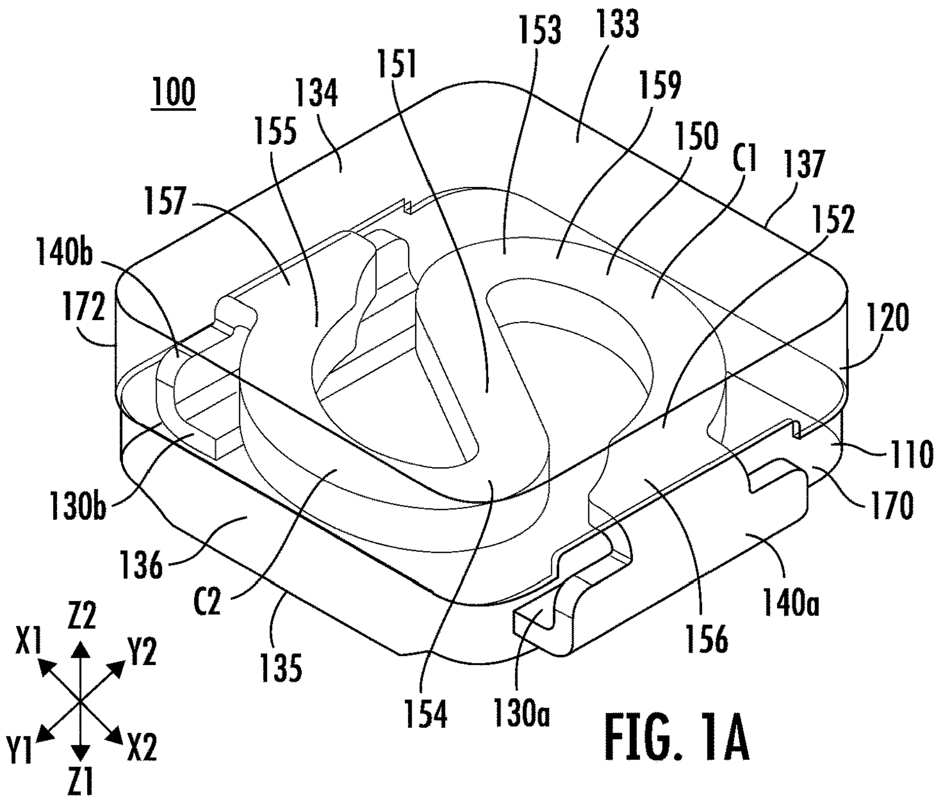
FIG. 1A illustrates an isometric view of an electro-magnetic device in partial transparency according to an aspect of the invention.
Figure 1B:
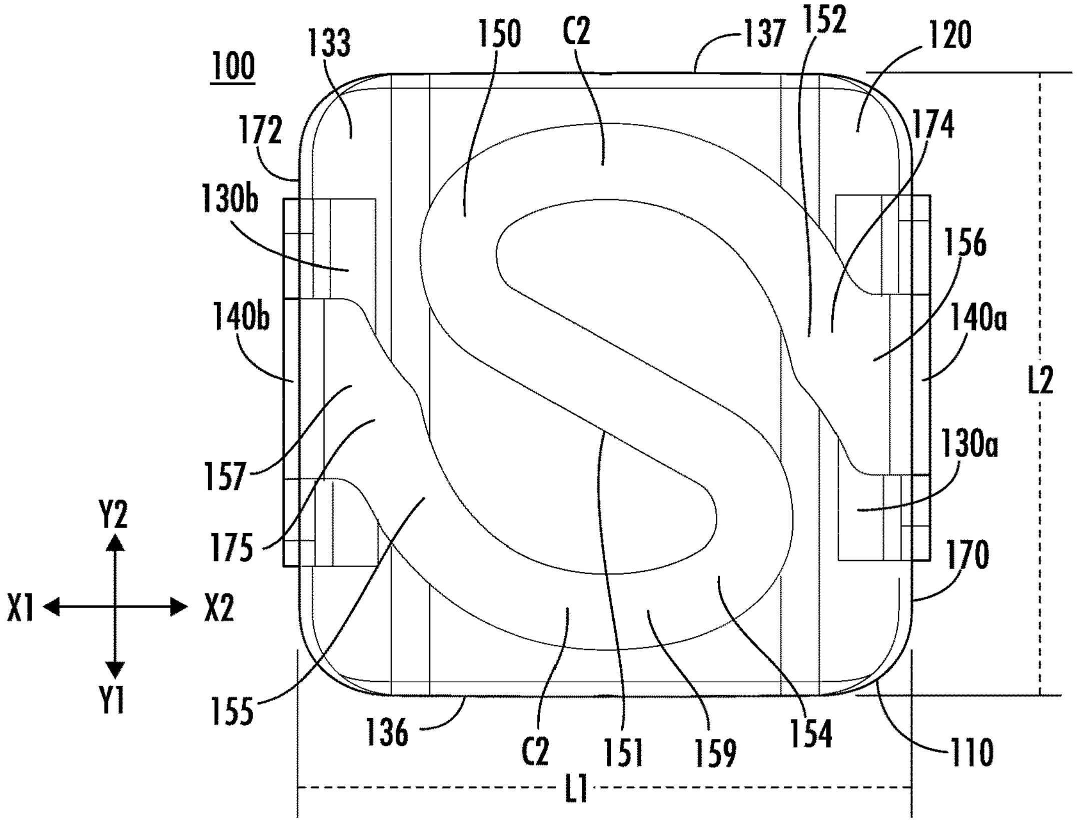
FIG. 1B illustrates top view of an electro-magnetic device in partial transparency according to an aspect of the invention as shown in FIG. 1A.
Figure 1C:
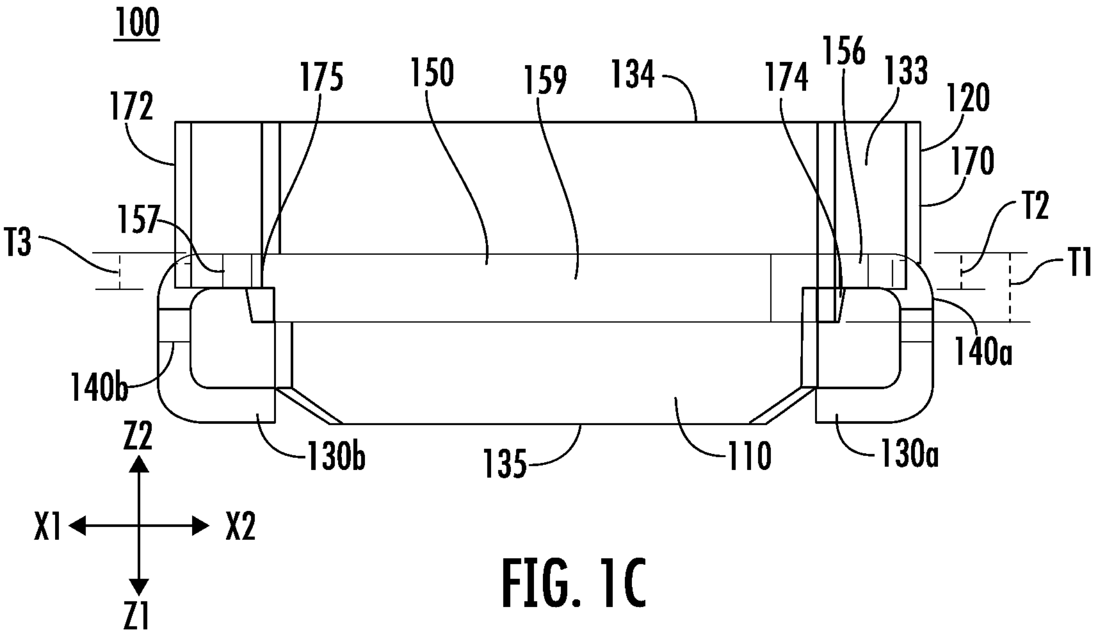
FIG. 1C illustrates a side view of an electro-magnetic device in partial transparency according to an aspect of the invention as shown in FIG. 1A.

FIGS. 1A-1C show an example of an electro-magnetic device 100 that may be formed according to an aspect of the invention, including a conductive element 150 having a selected shape. The conductive element may also be referred to as a "coil" or "coil area." In an embodiment shown in FIGS. 1A-1C, the conductive element 150 comprises a serpentine or meandering conductive element provided as an "S" conductive element, "S-shaped" conductive element, or "S-conductive element," when viewed as oriented in FIGS. 1A and 1B, or as viewed from above or below. A first curved portion C1 has a first end 152 extending adjacent one of the leads 140*a* (also referred to as a "lead portion"), and a second end 153, the first curved portion C1 curving around the center of the conductive element 150. A second curved portion C2 has a first end 155 extending from the other of the leads 140*b* (also referred to as a "lead portion"), and a second end 154, the second curved portion curving around the center of the conductive element 150 in an opposite direction from the first curved portion C1. Each curved portion forms an arc encircling part of the center of the conductive element 150. The curved portions may each run along a circumferential path about a central area of the device. A similarly shaped configuration of an electro-magnetic device is shown and described in U.S. Pat. No. 10,854,367, the entire contents of which is incorporated by reference as if fully set forth herein. The conductive element 150 has a central portion 151 crossing generally diagonally and extending between and connecting the second end 153 to the second end 154, and may preferably pass through the central area of the conductive element. The central portion 151 is generally straight.

An S-conductive element or "S" shape is illustrative of an aspect of the invention. Other configurations are also contemplated, including arcs, Z-shaped conductive element configurations or N-shaped conductive element configurations. Curved or straight conductive elements are also contemplated and within the scope of the invention. A conductive element configuration that extends along a meandering path between leads, with a portion of the conductive element crossing the mid-line or central portion of the conductive element or an electro-magnetic body, would be considered to be a "serpentine" conductive element. For example, and without limitation, an S-shaped conductive element, Z-shaped conductive element, N-shaped conductive element, and other shaped conductive elements having meandering paths traced from one lead to the other lead are considered to be "serpentine" conductive elements. The shape of the conductive element 150 may be designed to optimize the path length to fit the space available within the electro-magnetic while minimizing resistance and maximizing inductance. The shape may be designed to increase the ratio of the space used compared to the space available in the electro-magnetic body. In an embodiment of the invention, conductive element 150 has a top or upper surface that is preferably flat and oriented essentially in a plane. The serpentine conductive element may be considered a coil or coil area, but is distinguished from a "wound" conductive element formed from a wire or piece of conductive material that is wound about and encircles a central portion or axis of an electro-magnetic core.

As shown in FIGS. 1A-1C, the illustrated electro-magnetic device 100 has a length L1 running along the X1-X2 axis or direction, with X1 directed in a first direction and X2 being a second direction opposite the first direction, a length L2 running along the Y1-Y2 axis or direction, with Y1 directed in a third direction and Y2 directed in a fourth direction opposite the third direction, and a first thickness H1 (or height when viewed from the side as in FIG. 1C) running along the Z1-Z2 axis or direction, with Z1 directed in a fifth direction and Z2 directed in a sixth direction opposite the fifth direction. For ease of references, the Z1-Z2 axis is referred to as the "thickness." For ease of reference, the area or areas of the conductive element having an increased thickness or height may be referred to as an "increased thickness area."

According to an aspect of the invention, and as shown in FIG. 1C, the conductive element 150 has an increased thickness area 159, having an increased first thickness T1 along the Z1-Z2 axis as shown in FIG. 1C, as compared to the thicknesses second thickness T2 and third thickness T3 of the portions of the conductive material such as the leads 140*a*, 140*b*, and including the lead portions 156, 157, which are positioned adjacent the outer sides ends 174, 175 of the conductive element 150. In this configuration, essentially the entirety of the conductive element 150 having the "S"-shape comprises the increased thickness area 159. It is appreciated that a portion of the conductive element having an increased thickness area can also be less than the entirety of the conductive element having the "S"-shape. For example, a conductive element could be formed having thicker portions and thinner portions, with each of the thicker portions comprising an increased thickness area. In this configuration, the lead 140*a* has a thickness T2 along substantially the entire length of the lead 140*a*, and the lead 140*b* has a thickness T3 along substantially the entire length of the lead.

As shown in FIGS. 1A-1C, in an aspect of the invention, a finished electro-magnetic device such as an inductor 100 may include a body 133, also referred to as a core body, shown in partial transparency formed about, pressed over or otherwise housing or surrounding the conductive element and at least parts of the leads. The body may be formed as a first body portion 110 and a second body portion 120. The first body portion 110 and a second body portion 120 sandwich, are pressed around or otherwise house or surround the conductive element 150 and parts of the leads 140*a*, 140*b* to form the finished inductor 100. When compressed around the conductive element and portions of the leads, the first body portion 110 and a second body portion 120 may comprise and be considered as a single, unitary compressed body, and may be referred to simply as the "body" or alternately as a "core body."

The body 133 may be formed of a magnetic material comprising a ferrous material and may be formed having an upper or top surface 134 and an opposite lower or bottom surface 135, a first side 136 and an opposite second side 137, and a first lateral side lateral side 170 adjacent the first lead 140*a* and an opposite second lateral side 172 adjacent the second lead 140*b*. The body may comprise, for example, iron, metal alloys, and/or ferrite, combinations of those, or other materials known in the art of electro-magnetic devices and used to form such bodies. First body 110 and second body portion 120 may comprise a powdered iron or similar materials. Other acceptable materials as are known in the art of electro-magnetic devices may be used to form the body or body portions, such as known magnetic materials. For example, a magnetic molding material may be used for the body, comprising a powdered iron, a filler, a resin, and a lubricant, such as described in U.S. Pat. No. 6,198,375 ("Electro-magnetic conductive element structure") and U.S. Pat. No. 6,204,744 ("High current, low profile inductor"), the entire contents of which are incorporated by reference as if fully set forth herein. The body 133 may be formed of a magnetic material powder comprising one or more of the following materials: of iron, iron alloys, and/or ferrite, and/or combinations thereof. The body 133 may comprise, for example, iron, metal alloys, or ferrite, combinations of those, or other materials known in the art of inductors and used to form such bodies. Each of the materials listed or referenced in U.S. Pat. Nos. 6,198,375 and 6,204,744, including any combinations thereof, and any equivalents as are known in the relevant art, are generally referred to as the "core material" or "core materials." While it is contemplated that first body portion 110 and second body portion 120 are formed in similar fashion and of the same core material, first body portion 110 and second body portion 120 may be formed using different processes and from distinct core materials, as are known in the art.

The area of conductive material located between the increased thickness area T1 and the outer lateral sides 170, 172 of the body 133 may be considered either the beginning portions or parts of the leads 140*a* and 140*b*, or a transitional portion of the conductive element 150 that has a lesser thickness or height that extends between the increased thickness area to each of the lateral sides 170, 172. For ease of reference, this area is referred to as the first inner lead portion 156 and the second inner lead portion 157, and these portions will be contained within or otherwise surrounded by the body 133 as described further.

The first body portion 110 and second body portion 120 surround the conductive element and parts of the leads, and may be pressed or over-molded around the conductive element 150, initially leaving exposed parts of the leads 140*a*, 140*b* until they are folded underneath first body portion 110 as shown in their final state in the partially transparent examples of FIGS. 1 and 2. In a finished electro-magnetic device or "part," each lead 140*a*, 140*b* may have a portion running or otherwise extending along sides or side surfaces of the first body portion 110 as shown in FIGS. 1A-1C. The first lead 140*a* may terminate in a surface mount contact portion 130*a*, and the second lead 140*b* may terminate in a surface mount contact portion 130*b*, each bent underneath the lower surface 135 of the body 133, which may be the first body portion 110, as shown in FIGS. 1A-1C.

It is contemplated that an electro-magnetic device according to aspects of the invention may be formed without a core body, such as with leads that are bent to form surface mount terminations. An example is shown in FIG. 14. A similar device without a core body with leads that are straight or not bent, and extend straight outwards from the conductive element, or extend at an angle, is shown in FIG. 15. FIGS. 14 and 15, thus, show examples of finished electro-magnetic devices that may comprise a multi-thickness conductive element and lead portions as described, without any core materials or core body surrounding those elements. The electro-magnetic device 100' may comprise a conductive element 150' having a serpentine shape. A first curved portion C1' has a first end 152' extending adjacent one of the leads 140*a'* (also referred to as a "lead portion"), and a second end 153', the first curved portion C1' curving around the center of the conductive element 150'. A second curved portion C2' has a first end 155' extending from the other of the leads 140*b*' (also referred to as a "lead portion"), and a second end 154', the second curved portion curving around the center of the conductive element 150' in an opposite direction from the first curved portion Each curved portion forms an arc encircling part of the center of the conductive element 150'. The curved portions may each run along a circumferential path about a central area of the device. The conductive element 150' has a central portion 151' crossing generally diagonally and extending between and connecting the second end 153' to the second end 154', and may preferably pass through the central area of the conductive element. The central portion 151' is generally straight. A first inner lead portion 156' is positioned adjacent the first end 152'. A second inner lead portion 157' is positioned adjacent the second end 155'. The conductive element 150' has an increased thickness area 159'. In FIG. 15, the leads 140*a*', 140*b*', are shown extending straight and outwardly from the conductive element 150'. In FIG. 14, the leads 140*a*', 140*b*' are bent to form surface mount lead portions 130*a*', 130*b*'.

The leads 140*a*, 140*b* may each have the same uniform thickness, or substantially the same uniform thickness, along the entire length of each of the leads.

Figure 2A:
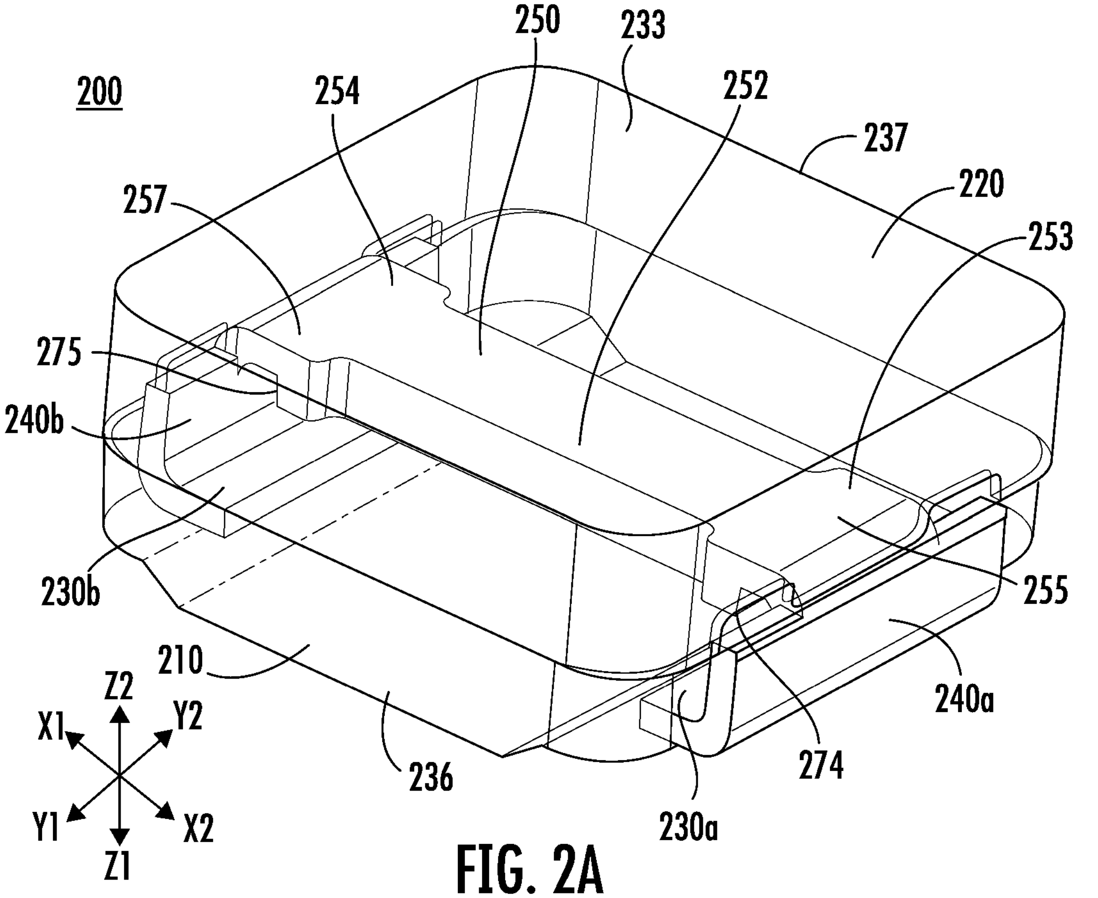
FIG. 2A illustrates an isometric view of an electro-magnetic device in partial transparency according to an aspect of the invention.
Figure 2B:
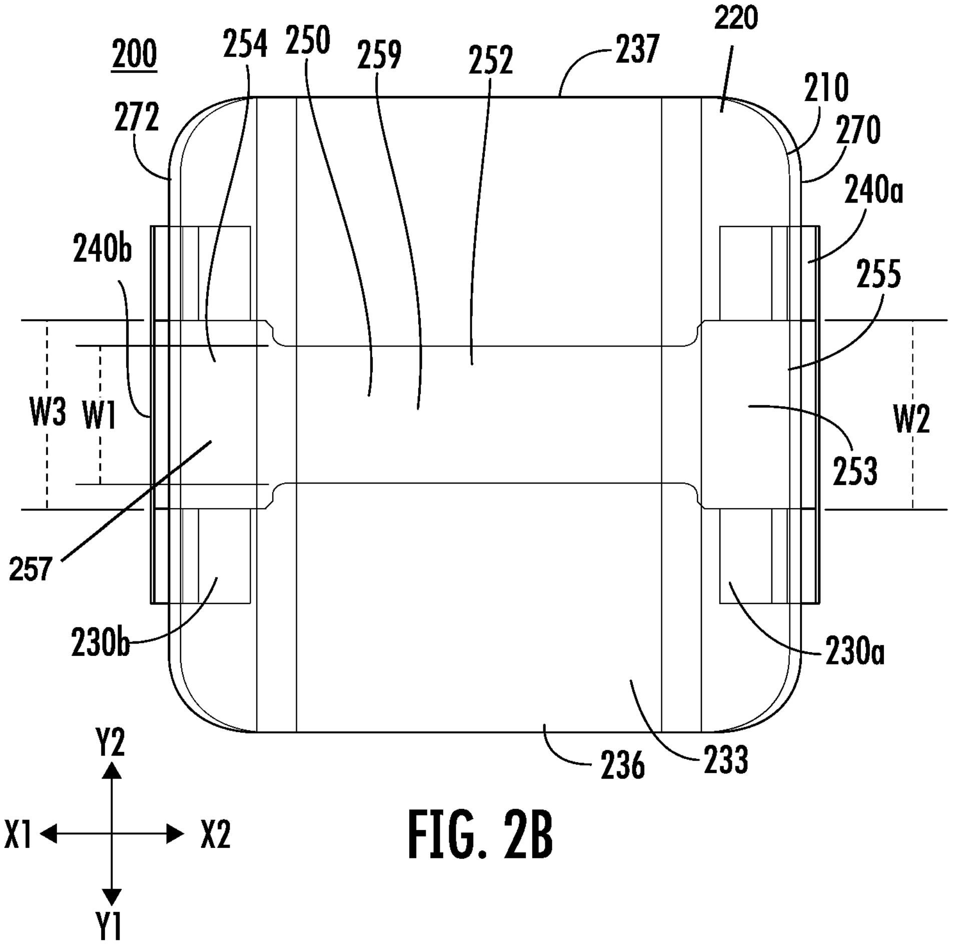
FIG. 2B illustrates top view of an electro-magnetic device in partial transparency according to an aspect of the invention as shown in FIG. 2A.
Figure 2C:
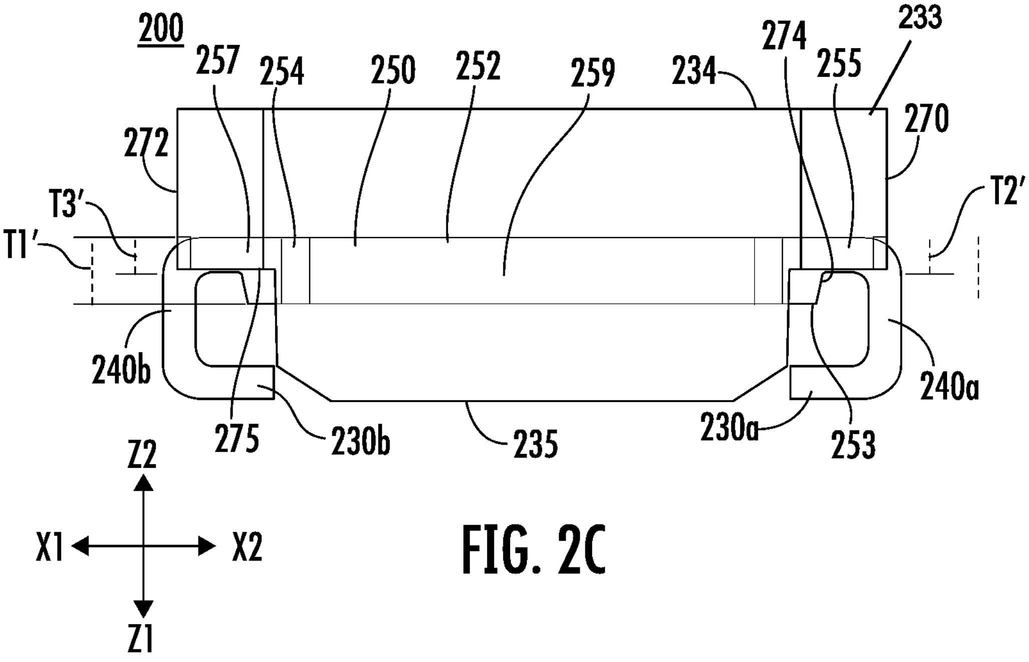
FIG. 2C illustrates a side view of an electro-magnetic device in partial transparency according to an aspect of the invention as shown in FIG. 2A.

In another aspect of the invention, FIGS. 2A-2C show an example of an electro-magnetic device 200 that may be formed according to an aspect of the invention, including a shaped conductive element 250. In the illustrative device shown in FIGS. 2A-2C, the conductive element 250 comprises an essentially straight conductive element provided as an "I" or "H" shaped conductive element, or one having a "barbell" shape, when viewed from the top as in FIG. 2B. Such a conductive element may further be considered or referred to as a coil. In such an arrangement, a central portion 252 of the conductive element 250 has a width W1 along the Y1-Y2 axis or direction as viewed in FIGS. 2A-2C, a first side portion 253 has an outer width W2 along the Y1-Y2 axis or direction as viewed in FIGS. 2A-2C that is greater than the width W1, and a second side portion 254, on an opposite side of the device 200 than the first side portion 253, that has an outer width W3 along the Y1-Y2 axis or direction as viewed in FIG. 3 that is greater than the width W1, and may be the same as the width W2. The conductive element 250 may have a generally rectangular shape between the first side portion 253 and second side portion 254.

As shown in FIGS. 2A-2C, according to an aspect of the invention, the conductive element 250 has an increased thickness area 259 having an increased first thickness T1' along the Z1-Z2 axis or direction as shown in FIG. 2C, as compared to the second thickness T2' and the third thickness T3' of other portions of the conductive material such as the lead portions, including first inner lead portion 255 and second inner lead portion 257, adjacent the outer sides ends 274, 275 of the conductive element 250. In this configuration, substantially the entirety of the conductive element having the "barbell"-shape may have an increased first thickness T1'. It is appreciated that a portion of the conductive element having an increased thickness area can also be less than the entirety of the conductive element having the "barbell"-shape. It is noted that the conductive element 250 is not wound around an axis.

While a finished electro-magnetic device according to the invention may be formed without a core body, as shown in FIGS. 2A-2C, in an aspect of the invention, a finished electro-magnetic device 200 such as an inductor may include a body 233, or core body, shown in partial transparency formed about, pressed over or otherwise housing or surrounding the conductive element 250 and at least parts of the leads 240*a*, 240*b*. The body 233 and may be formed having an upper or top surface 234 and an opposite lower or bottom surface 235, a first side 236 and an opposite second side 237, and a first lateral side lateral side 270 adjacent the first lead 240*a* (or "lead portion") and an opposite second lateral side 272 adjacent the second lead 240*b* (or "lead portion"). The body may be formed as a first body portion 210 and a second body portion 220. The first body portion 210 and a second body portion 220 sandwich, are pressed around or otherwise house the conductive element 150 and parts of the leads 240*a* and 240*b* to form the finished inductor 200. When compressed around the conductive element and portions of the leads, the first body portion 210 and a second body portion 220 may be considered as a single, unitary compressed body form from a core material or core materials.

The first body portion 210 and second body portion 220 surround the conductive element and parts of the leads and may be pressed or over-molded around the conductive element 250, initially leaving exposed parts of the leads 240*a* and 240*b* until they are folded underneath first body portion 210 as shown in their final state in the partially transparent examples of FIGS. 2A-2C. In a finished electro-magnetic device or "part," each lead 240*a* and 240*b* may run along sides 270, 272 of the first body portion 210 as shown in FIGS. 2A-2C. The first lead lead 240*a* may terminate with a first contact portion 230*a*, and the second lead 240*b* may terminate with a second contact portion 230*b*, each contact portion bent underneath the lower surface 235 of the body 233, such as the first body portion 210, as shown in FIGS. 2A-2C.

Methods of making the electro-magnetic devices as illustrated, by way of example, in FIGS. 1A-2C, or FIG. 14-16, or similar electro-magnetic devices having multi-thickness elements, or multi-thickness templates that may be used in forming the electro-magnetic devices illustrated in FIGS. 1A-2C, in FIGS. 1A-2C, or FIGS. 14-16, or similar electro-magnetic devices, will now be described. In some aspects, the templates may be formed as lead frames.

Figure 3:
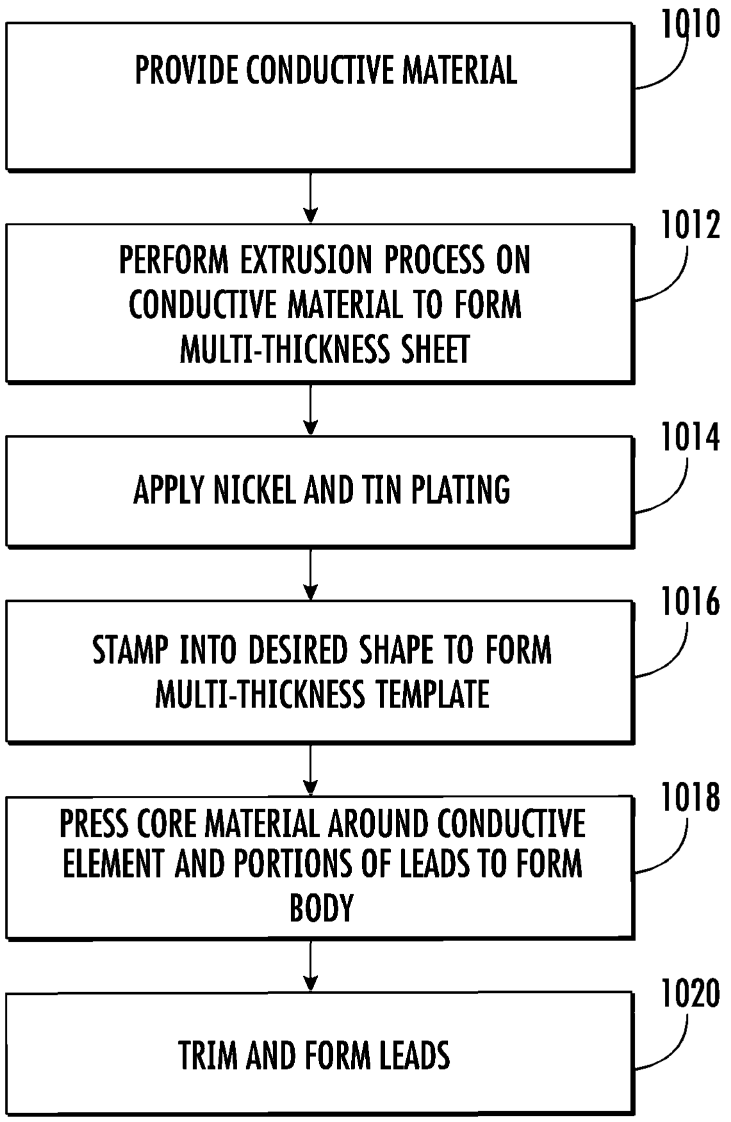
FIG. 3 shows a flowchart illustrating a method of making a multi-thickness template and electro-magnetic device according to an aspect of the invention.

In an aspect of the invention, a method of making an electro-magnetic device is illustrated via a flowchart provided in FIG. 3.

At step 1010, a conductive material is provided. The conductive material may be heated to form a molten conductive material to be shaped as described herein. Examples of conductive material that may be used include, but are not limited to, copper, steel, aluminum, zinc, bronze, or combinations or alloys of those. Examples of conductive material that may be used further include conductive materials provided in wire form, such as copper wire, aluminum wire, and platinum wire.

Figure 5A:
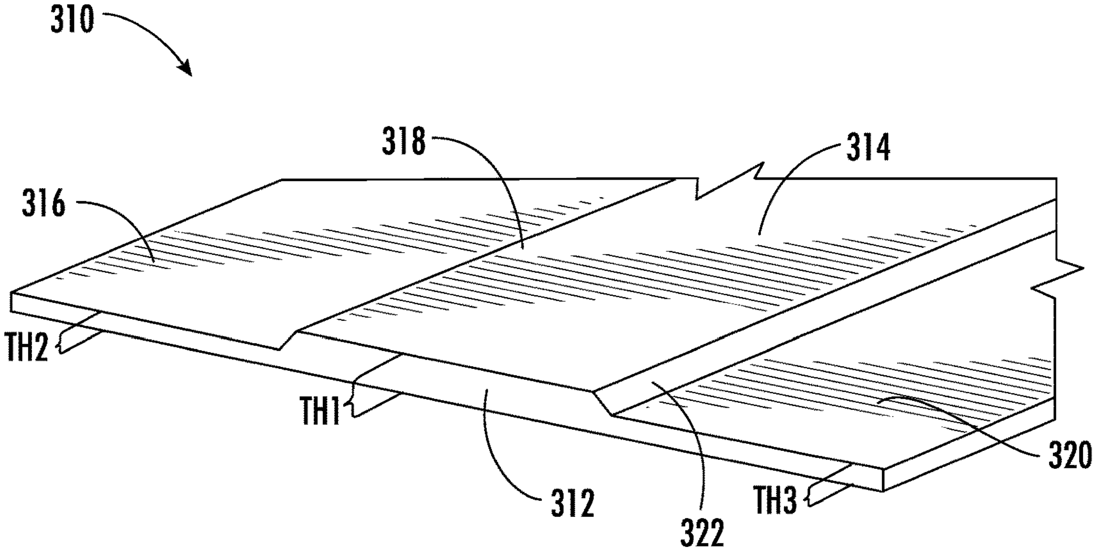
FIG. 5A illustrates a multi-thickness metal sheet according to an aspect of the invention.
Figure 5B:
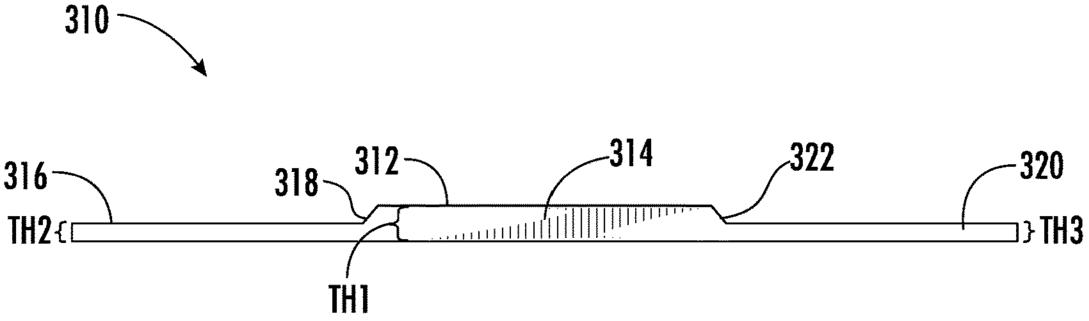
FIG. 5B illustrates a side view of the multi-thickness metal sheet of FIG. 5A.

At step 1012, the conductive material is extruded via a metal extrusion process to form a multi-thickness sheet, such as extruding the heated or molten conductive material through an opening of a selected shape. An extrusion process may comprise forcing a near-molten or heated conductive material, such as a metal, through a die having a desired profile or shape. FIGS. 5A and 5B illustrate a multi-thickness sheet 310, having a central area 312 having an increased thickness area 314 having an increased first thickness TH1, a first outer side portion 316 adjacent a first side 318 of the increased thickness area 314 having a second thickness TH2 that is less than the thickness TH1, and a second outer side portion 320 adjacent a second side 322 of the increased thickness area 314 having a third thickness TH3 that is less than the thickness TH1. As shown the first outer side portion 316 and second outer side portion 320 may be on opposite sides of the increased thickness area 314. The multi-thickness sheet 310 is used to form a template, as further described.

At step 1014, the multi-thickness sheet 310 may be plated, using an electro-plating or similar process, with nickel as a first layer, and tin applied on top of the nickel as a second layer. Known plating methods may be used to apply the nickel and tin layers. These layers provide for increased solderability.

Figure 6:
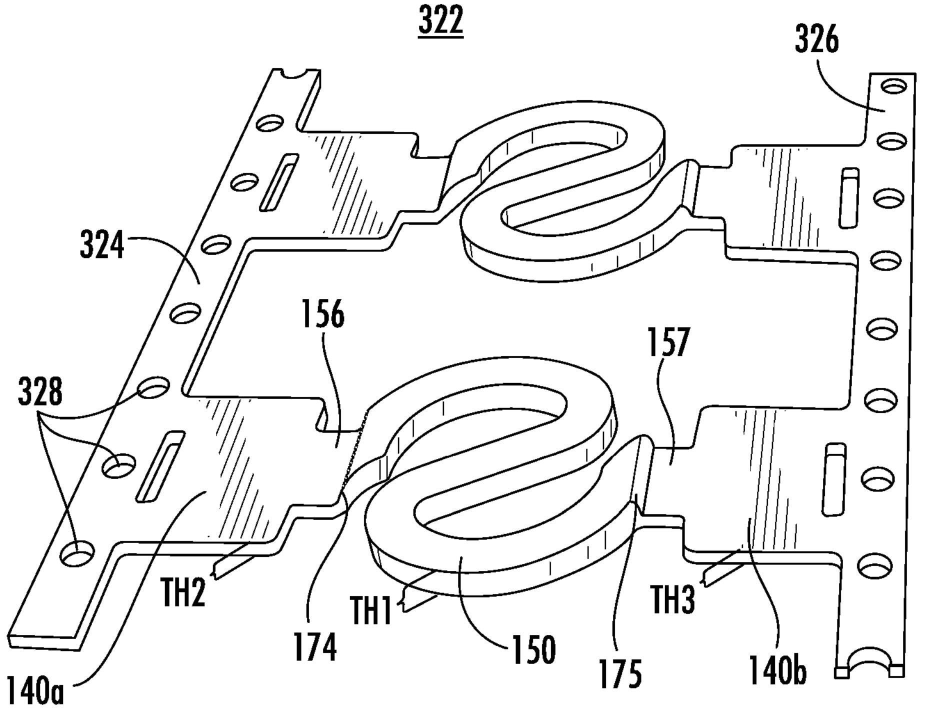
FIG. 6 illustrates a multi-thickness template according to an aspect of the invention.

At step 1016, the multi-thickness sheet 310 is stamped or otherwise machined or shaped to form a multi-thickness template 322 for use in an electro-magnetic device, such as shown in FIGS. 1A-1C. FIG. 6 illustrates a multi-thickness template 322 having a conductive element 150 according to the arrangements as illustrated in FIGS. 1A-1C, although it is appreciated that conductive elements of various shapes can be formed without departing from the teachings herein. When stamped or otherwise machined, the template 322 comprises an increased thickness area associated with the increased thickness area 314 having an increased thickness TH1 of the multi-thickness sheet 310 used to form the template 322. The conductive element 150 may be located in a central or inner area of the template.

While more than one conductive element is shown by way of example in FIG. 6, a template may be provided where only a single conductive element is provided. In addition, more than two, or any number, of conductive elements may be provided by a template.

It is noted that steps 1014 and 1016 may be performed in any order. For example, the multi-thickness sheet 310 may be formed multi-thickness template 322 according to step 1016, and them plated according to step 1014.

As shown in FIG. 6, the template 322 includes leads 140*a*, 140*b* connected to the conductive element 150, with the areas forming the leads 140*a*, 140*b* associated with the first outer side portion 316 having a thickness TH2, and the second outer side portion 320 a having a third thickness TH3. Therefore, the leads 140*a* and 140*b* each have a thickness that is less than the increased thickness TH1 of the conductive element 150. The first inner lead portion 156 and the second inner lead portion 157 adjacent the conductive element 150 allow for ease in forming the leads, such as by bending. As the leads are of a decreased thickness, those areas are easier to bend and form surface mount leads without cracking or breaking. As shown in FIGS. 1B and 6, the leads 140*a*, 140*b* may have a width along the Y1-Y2 axis or direction that is less than a width of the conductive element 150.

As shown for example in FIGS. 1A-1C and FIG. 6, the first inner lead portion 156 of the first lead 140*a*, and the second inner portion 157 of the second lead 140*b* may have a width (along the Y1-Y2 axis or direction) that is narrower or less than the width of the other portions of the leads 140*a*, 140*b*, such as the first surface mount contact portion 130*a* and the second surface mount contact portion 130*b*.

The upper surface of the conductive element 150 may be formed so as to lie essentially in or along a plane. The lower surface of the conductive element 150 may be formed so as to lie essentially in or along a plane. The upper or lower surfaces of the conductive element may be generally flat.

The leads 140*a*, 140*a* may be formed so as to have upper or lower surfaces that lie essentially in or along a plane. The upper or lower surfaces of the leads 140*a*, 140*b* may be generally flat.

As shown in FIG. 6, the template 322 may be formed as a lead frame, and may comprise at least first and second carrier strips 324, 326 at opposite outer portions of the lead fame 322. The carrier strips 324, 326 may have progressive holes 328 used for alignment in connection with manufacturing equipment. The carrier strips 324, 326 may therefore be considered optional.

It is noted that the conductive element 150 and leads 140*a*, 140*b*, as well as the carrier strips 324, 326 if present, are all formed from the same piece of conductive material, that has been pre-shaped to provide for a conductive element 150 having an increased thickness as compared to the thickness of leads 140*a*, 140*b*. The conductive element 150 is formed in a preselected shape without the need for winding or turning a metal strip or wire. No portion of the conductive element 150 crosses over or under another portion of the conductive element 150. The inductance of electro-magnetic devices according to the teachings herein can be adjusted by, for example: changing the thickness, width, shape, or other dimensions, of the conductive elements; changing the core materials; increasing or decreasing the thickness of the core material; changing the density of the core material such as by hot or cold pression; and/or the positioning of the conductive element within the core body.

It is further noted that FIG. 15 may also be considered as showing a template for an electro-magnetic device, that may be further formed, such as by trimming or bending the leads 140*a*', 140*b*'. In this instance, the template would be formed by stamping a multi-thickness conductive material into the shape shown in FIG. 15.

Figure 7:
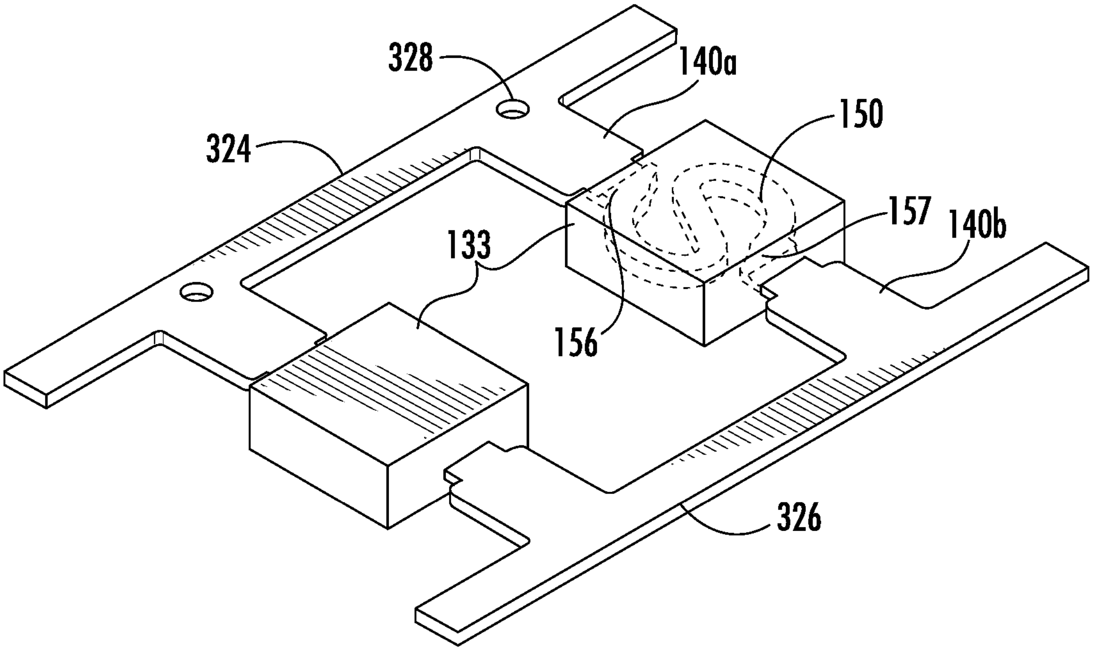
FIG. 7 illustrates a multi-thickness template according to an aspect of the invention with a body formed around areas of the template.

At step 1018, where the device is to have a core body, one or more core materials, and preferably a core material comprising an iron and/or ferrite powder, are pressed around the conductive element 150 and portions of the leads 140*a*, 140*b*, including the first inner lead portion 156 and the second inner lead portion 157, to form the body 133. To form the body 133, the plated template 322 may be inserted into a compacting press where one or more core materials are pressed around the coil portion of the leadframe in a desired shape, such as, for example, a generally rectangular shape, although as shown, the shape may include rounded corners or edges. FIG. 7 illustrates the template 322 with an illustration of the body 133 shown in partial transparency, and showing the body formed around the conductive element 150 and portions of the leads 140*a*, 140*b*. It is note that step 1018 may be optional if an electro-magnetic device is to be formed without a core body.

At step 1020, portions of the template adjacent the leads are trimmed to selected sizes and positioned around the body 133 to form surface mount leads, which are desirable for modern circuit board assembly processes. At least portions of each of the leads 140*a*, 140*b* are positioned along side surfaces of the body 133, and at least the end portions 130 of the leads 140*a*, 140*b* are bent under and positioned along portions of the bottom surface 135 of the body 133. An example of a finished electro-magnetic device 100 is shown in FIG. 1A, as previously described.

Figure 8:
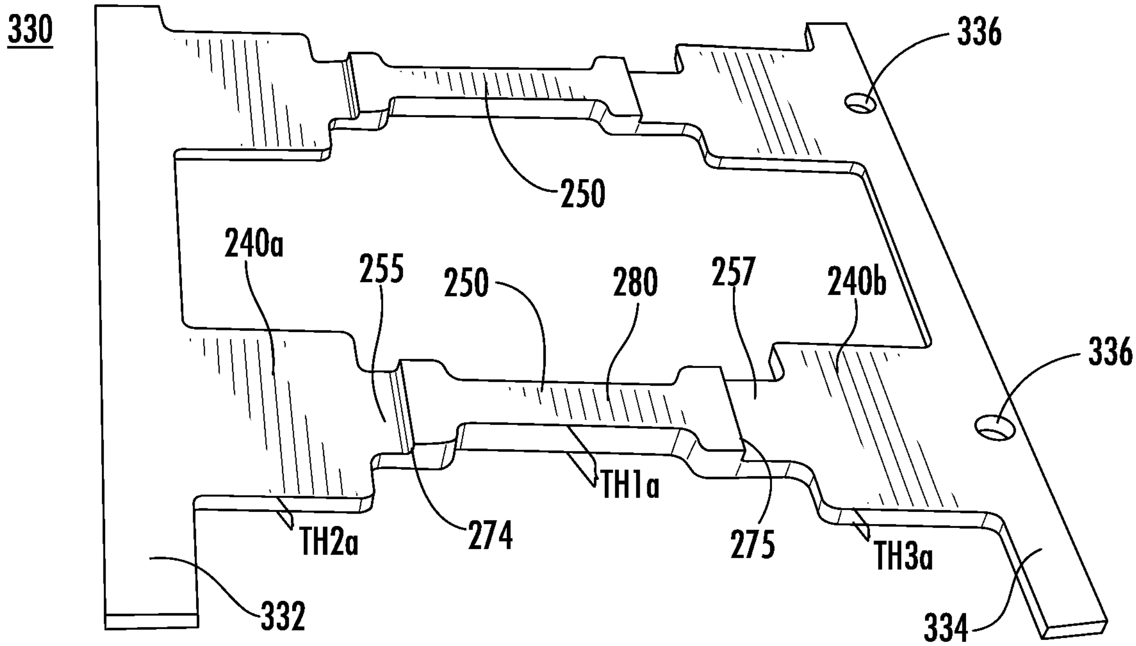
FIG. 8 illustrates a multi-thickness template according to an aspect of the invention.

FIG. 8 illustrates a template 330 which may be formed according to the steps illustrated in FIG. 3 and associated with the electro-magnetic device having a conductive element 250 as shown in FIGS. 2A-2C. As shown in FIG. 8, the template 330 includes a conductive element 250 comprising a straight conductive element provided as an "I" or "H" shaped conductive element, or one having a "barbell" shape, when viewed from the top. The template may be formed following the steps previously outlined in FIG. 3 and described above. At step 1016, the selected shape of the conductive element 250 is that as shown in FIGS. 2A-2C.

As shown in FIG. 8, the template 330 includes the conductive element 250, as well as leads 240*a*, 240*b*. If the template 330 is formed as a lead frame, for example, carrier strips 332, 334 may be provided. The conductive element 250 and leads 240*a*, 240*b*, are all formed from the same single piece of conductive material. The carrier strips 332, 334 may have progressive holes 336 used for alignment in connection with manufacturing equipment. The conductive element 250 may be formed having an increased thickness area 280 with a thickness TH1*a*. The first lead 240*a* has a thickness TH2*a*, and the second lead 240*b* has a third thickness TH3*a*. Therefore, the leads 240*a*, 240*b* each have a thickness that is less than the increased thickness TH1*a* of the conductive element 150. The first inner lead portion 255 and the second inner lead portion 257 adjacent the conductive element 150 have a decreased thickness allowing for ease in forming the leads, such as by bending. As the leads are of a decreased thickness, those areas are easier to bend and form surface mount leads without cracking or breaking. As shown for example in FIGS. 2B and 8, the first inner lead portion 255 and the second inner lead portion 257 may have widths (along the Y1-Y2 axis or direction) that are narrower or less than the widths of the other portions of the leads 240*a*, 240*b*, such as the first surface mount contact portion 230*a*, or the second surface mount contact portion 230*b*.

A skiving or cutting process may also be used to make an electro-magnetic device according to aspects of the invention. A skiving process uses a cutting blade to skim away material.

Figure 4:
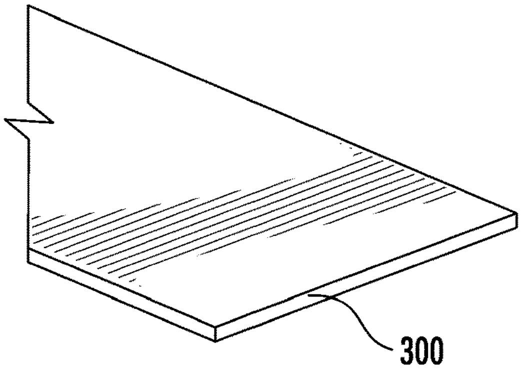
FIG. 4 illustrates a metal sheet formed from a conductive material according to aspects of the invention.
Figure 9:
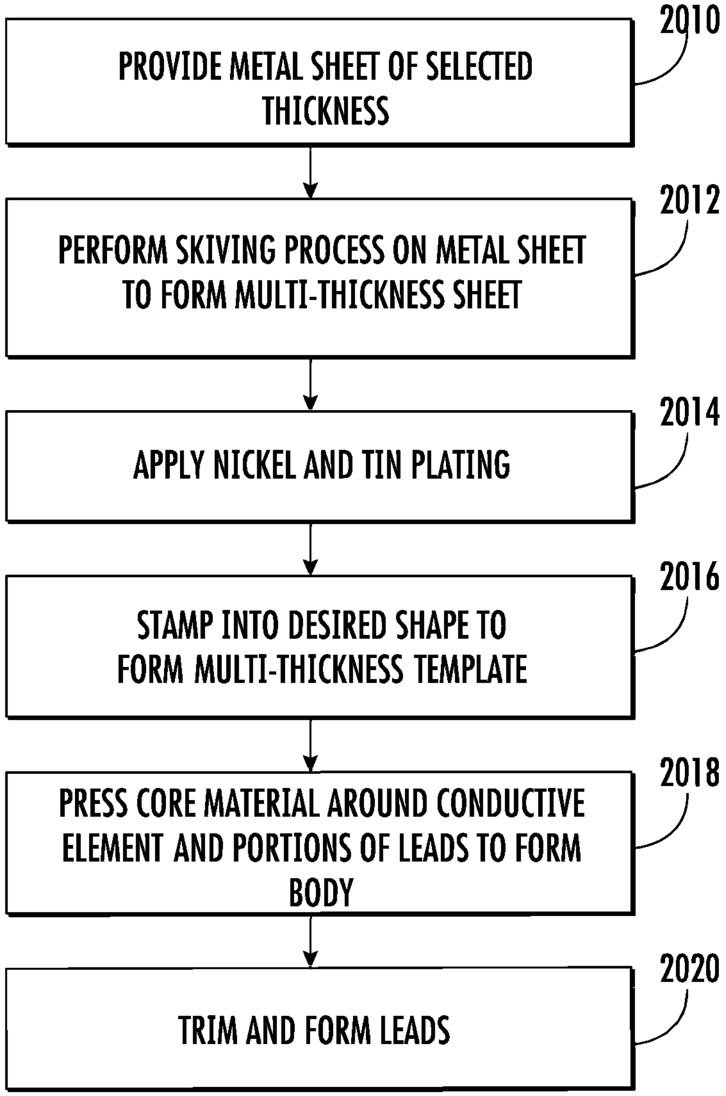
FIG. 9 shows a flowchart illustrating a method of making a multi-thickness template and electro-magnetic device according to an aspect of the invention.

In an aspect of the invention, a method of making an electro-magnetic device is illustrated via a flowchart provided in FIG. 9. At step 2010, a sheet of conductive material is provided as the starting material, which may be formed from a conductive material such as through a rolling or press process. FIG. 4 illustrates an exemplary sheet 300 of conductive material. The term "sheet" is used to also capture the concept of a sheet or plate or strip of piece of conductive material to be used as a starting material for forming a template of the invention. Preferably, the sheet 300 of conductive material comprises a metal such as copper. Examples of conductive material that may be used to form the sheet 300 include, but are not limited to, copper, steel, aluminum, zinc, bronze, or combinations or alloys of those. The thickness of the metal sheet may be selected such that the thickness is that of the increased thickness area of the conductive element to be formed from the sheet. It is further contemplated that the conductive material can be formed or provided as, or may start as, a rod, wire, or other arrangement or shaped that can be processed or formed according to teachings herein without departing from aspects of the invention. Thus, while a sheet is used as an example, other conductive materials having other shapes can be used to form the electro-magnetic devices as shown and described.

At step 2012, a skiving process is performed whereby the sheet is cut with a blade to form a multi-thickness sheet 410.

FIG. 10 illustrates a cutting blade 437 having a raised central cutting portion 439 shown in the process of cutting a sheet of conductive material to form a multi-thickness sheet 410. The resultant multi-thickness sheet 410 has a central area 412 provided as an increased thickness area having an increased thickness, a first outer side portion 416 adjacent a first side 418 of the increased thickness area 414 having a second thickness that is less than the thickness of the central area 412, and a second outer side portion 420 adjacent a second side 422 of the increased thickness area 414 having a third thickness that is less than the thickness of the central area but may be equal to the thickness of the first outer side portion 416. As shown the first outer side portion 416 and second outer side portion 420 may be on opposite sides of the increased thickness area 414. The multi-thickness sheet 410 is used to form a template, as further described.

At step 2014, the multi-thickness sheet may be plated, using an electro-plating or similar process, with nickel as a first layer, and then tin on top of the nickel as a second layer.

At step 2016, the multi-thickness sheet 410 is stamped or otherwise machined to form a multi-thickness template for use in an electro-magnetic device, such as shown in FIGS. 1A-1C. A this stage, the process provides for a FIG. a multi-thickness template such as shown in FIG. 6.

At step 2018, one or more core materials, and preferably a core material comprising an iron and/or ferrite powder, are pressed around the conductive element and portions of the leads including the first inner lead portion and the second inner lead portion, to form the body. At this stage, FIG. 7, discussed previously, illustrated the body 133 formed around portions of the template. Step 2018 may be optional if a core body is not desired.

At step 2020, portions of the template adjacent the leads are trimmed to selected sizes and positioned around the body to form surface mount leads, which are desirable for modern circuit board assembly processes. At least portions of each of the leads are positioned along side surfaces of the body, and at least the end portions of the leads are bent under and positioned along portions of the bottom surface of the body. An illustrative final electro-magnetic device 100 is shown in FIG. 1A, as previously described.

The skiving process described may also be used to form an electromagnetic design having the arrangement as illustrated in FIGS. 2A-2C. The skiving process described may also be used to form conductive elements having various shapes, sized, orientations, and/or arrangements.

A swaging and/or pressing and/or flattening process may also be used to form an electro-magnetic device according to aspects of the invention.

In an aspect of the invention, a method of making an electro-magnetic device is illustrated via a flowchart provided in FIG. 11. At step 3010, a sheet of conductive material is provided as the starting material. The sheet 300 shown in FIG. 4 illustrates such an exemplary sheet of conductive material.

At step 3012, the sheet may be plated, using an electroplating or similar process, with nickel as a first layer, and then tin on top of the nickel as a second layer. In this aspect, the sheet is of a uniform thickness at this stage of the process. The thickness represents an increased thickness of the conductive element, as discussed further.

At step 3014, a stamping or other machining process is performed in order to form a template of a uniform thickness.

FIG. 12 illustrates a template 500 in the process of formation, including a shaped conductive element 520, a first lead 530*a*, a second lead 530*b*, all formed from the same single piece of conductive material forming the sheet. If the template 500 is formed as a lead frame, carrier strips 540, 542 may be provided. The carrier strips 540, 542, may have progressive holes 544 used for alignment in connection with manufacturing equipment.

To obtain a multi-thickness template, in step 3016, the first lead 530*a* and the second lead 530*b*, or portions of each of those, are flattened, such as by swaging or pressing.

FIG. 13 illustrates a detailed view of a portion of the template 500, with the first lead 530*a* and the second lead 530*b* flattened or compressed, thereby providing the leads with a decreased thickness as compared to the thickness of the conductive element 520. Different processes could be used for producing the decreased thickness portions, such as, for example, stamping, coining, roll forming, or milling.

Upon flattening the first lead 530*a* and the second lead 530*b*, the template 500 with the conductive element 520 having a central area 512 formed as an increased thickness area 514 having a thickness of the original sheet, the first lead 530*a* having a decreased thickness that is less than the thickness of the central area 512, and the second lead 530*b* having a decreased thickness that is less than the thickness central area 512, but may be the same thickness as the first lead 530*a*. The carrier strips 540, 542 may have the same thickness as the conductive element 520 if those areas are not also flattened.

At step 3018, one or more core materials, and preferably a core material comprising an iron and/or ferrite powder, are pressed around the conductive element 520 and portions of the leads 530*a*, 530*b* to form the body 546. To form the body 546, the plated template 520 may be inserted into a compacting press where the one or more core materials are pressed around the coil portion of the leadframe in a desired shape, such as, for example, a generally rectangular shape, although as shown, the shape may include rounded corners or edges. At this stage, the lead body and frame are arranged similarly to FIG. 7 described previously. Step 3018 may be optional if no core body is desired.

At step 3020, portions of the template adjacent the leads are trimmed to selected sizes and positioned around the body 546 to form surface mount leads, which are desirable for modern circuit board assembly processes. At least portions of each of the leads 530*a*, 530*b* are positioned along the side surfaces of the body 133, and at least the end portions of the leads 530*a*, 530*b* are bent under and positioned along portions of the bottom surface of the body 546.

It is contemplated that the steps used in FIG. 11 may be employed to form a template including a conductive element comprising a straight conductive element provided as an "I" or "H" shaped conductive element, or one having a "barbell" shape, when viewed from the top, such as in FIGS. 2A-2C.

Further, a conductive element having an increased thickness area could be formed by starting with a generally uniform thickness template such as shown in FIG. 12, and building up the conductive element 520 by plating. For example, copper plating could be plated over or on top of the conductive element 520 until a certain thickness is achieved. This "build up" process could be accomplished by, for example, 3D printing a plating material, or by otherwise depositing metal using methods known to the metal working industry (e.g., sputtering, etc.) onto the conductive element 520.

The methods described herein can also be used to form an electro-magnetic device having a shaped conductive element that has a reduced thickness as compared to the thicknesses of one or more of the leads. For example, referring to FIG. 3, as step 1012, the extrusion process may form a multi-thickness sheet, where the central portion of the sheet has a decreased thickness, and the outer sides of the sheet have a thickness greater than the central portion. By way of further example, referring to 9, at step 2012, the skiving process may form a multi-thickness sheet, where the central portion of the sheet has a decreased thickness, and the outer sides of the sheet have a thickness greater than the central portion. By way of further example, referring to FIG. 11, at step 3016, the flattening process may flatten the conductive element rather than the leads, creating a conductive element of a decreased thickness as compared to the leads.

Thus, as illustrated by way of example in FIG. 16, a template 700 has been stamped from a uniform thickness piece of conductive material, such as a sheet as shown in FIG. 4. The stamping or other forming process forms a conductive element 750, which may be a serpentine conductive element, a first lead 740*a*, and a second lead 740*a*, all formed from the same piece of conductive material. In this aspect, the conductive element 750 is stamped, pressed, swaged, or skived, to produce an electro-magnetic device having a conductive element of a decreased thickness, as compared to the leads 740*a*, 740*b*. The conductive element 750 may be serpentine, barbell shaped, or another selected shape, and may be generally flat, with one or more surfaces lying along or in a plane. The leads 740*a*, 740*b* may be bent or trimmed as known in the art or as described herein. A core body may be molded around the conductive element 750 and portions of the leads.

The conductive material or sheet of conductive material may be formed such that the area to be used for forming a conductive element may have a different hardness than the area to be used for forming the first lead portion or the second lead portion. For example, a first portion of the conductive material may have a first hardness (e.g., half hard) and a second portion of the conductive material may have a second hardness (e.g., annealed soft). Alternately, a first portion of the conductive material may have a first hardness (e.g., Hardness Vickers 100 HV10) and a second portion of the conductive material may have a second hardness (e.g., Hardness Vickers 30 HV10).

It is appreciated that the surfaces of the conductive elements and/or leads described herein may be somewhat or slightly rounded, bowed or curved based on the process used to form the conductive element, and the side edges may be rounded or curved or bowed. Acceptable metals used for forming the conductive element and leads may be copper, aluminum, platinum, or other metals for use as electro-magnetic conductive elements as are known in the art. As used herein, "flat" means "generally flat," i.e., within normal manufacturing tolerances. It is appreciated that the flat surfaces of the conductive element and/or leads may be somewhat or slightly rounded, bowed, curved or wavy based on the process used to form the conductive element, and the side edges may be somewhat or slightly rounded, bowed, curved or wavy, while still being considered to be "flat."

The increased thickness portions or areas of the conductive elements described herein act to decrease the direct current resistance (DCR) of an electro-magnetic device such as an inductor comprising such conductive elements.

The templates described herein provide for multiple thicknesses, in a single unitary piece. The templates described herein may also be formed by 3D printing techniques.

The decreased thickness areas of the leads or lead portions of the templates allow for ease in forming the leads, such as by shaping and/or bending. In addition, the thinner yet wide lead portions provide for improved heat transfer when mounted to a circuit board, and further provide for improved mounting strength with resistance from shock and vibration due to the width of the surface mount leads or terminations.

It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A method for making a multi-thickness electro-magnetic device comprising the steps of:

providing a conductive material;

forming the conductive material into a multi-thickness sheet by performing an extrusion process, a skiving process, or a flattening process, the multi-thickness sheet comprising a first portion having a first thickness, a second portion having a second thickness, and a third portion have a third thickness; and forming a multi-thickness template by:

forming the first portion of the multi-thickness sheet into a conductive element, forming the second portion of the multi-thickness sheet into a first lead portion, and forming the third portion of the multi-thickness sheet into a second lead portion;

wherein the first thickness is greater than the second thickness, and wherein the first thickness is greater than the third thickness.

2. The method of claim 1, wherein at least a portion of the multi-thickness template is formed by stamping the multi-thickness sheet.

3. The method of claim 1, wherein the conductive element has a serpentine shape, a rectangular shape, an I-shape, an H-shape, or a barbell shape.

4. The method of claim 1, wherein the conductive element, the first lead portion, and the second lead portion are formed from a continuous, non-wound piece of conductive material.

5. The method of claim 1, wherein no portion of the conductive element crosses over or under another portion of the conductive element.

6. The method of claim 1, wherein the first lead portion has a thickness that is uniform along substantially an entire length of the first lead portion, and the second lead portion has a thickness that is uniform along substantially an entire length of the second lead portion.

7. The method of claim 1, wherein the first lead portion has a first width adjacent the conductive element and a second width at an end of the first lead portion, and wherein the second width is different than the first width.

8. The method of claim 1, wherein the second lead portion has a first width adjacent the conductive element and a second width at an end of the second lead portion, and wherein the second width is greater than the first width.

9. A method for making an electro-magnetic device comprising the steps of:

providing a conductive material;

forming the conductive material into a multi-thickness sheet, the multi-thickness sheet comprising a first portion for forming a conductive element having a first thickness, a second portion for forming a first lead portion having a second thickness, and a third portion for forming a second lead portion having a third thickness, wherein the first thickness is greater than the second thickness, and wherein the first thickness is greater than the third thickness;

forming a multi-thickness template by:

forming the first portion of the multi-thickness sheet into the conductive element, forming the second portion of the multi-thickness sheet into the first lead portion, and forming the third portion of the multi-thickness sheet into the second lead portion; and pressing a core material around the conductive element and at least a portion of the first lead portion and at least a portion of the second lead portion to form a body.

10. The method of claim 9, further comprising the steps of trimming the first lead portion and trimming the second lead portion.

11. The method of claim 10, further comprising the steps of positioning at least a portion of the first lead portion along an outer surface of the body and extending at least a portion of the first lead portion along a bottom surface of the body, and further comprising the steps of positioning at least a portion of the second lead portion along an outer surface of the body and extending at least a portion of the second lead portion along a bottom surface of the body.

12. The method of claim 9, wherein the step of forming the conductive material into a multi-thickness sheet comprises performing an extrusion process.

13. The method of claim 9, wherein the step of forming the conductive material into a multi-thickness sheet comprises performing a skiving process.

14. The method of claim 9, wherein the step of forming the conductive material into a multi-thickness sheet comprises performing a flattening process.

15. The method of claim 9, wherein the step of forming the multi-thickness template comprises stamping the multi-thickness sheet to form the conductive element, the first lead portion, and the second lead portion.

16. The method of claim 9, wherein the conductive element has a serpentine shape, a rectangular shape, an I-shape, an H-shape, or a barbell shape.

17. The method of claim 9, wherein the conductive element, first lead portion, and second lead portion are formed from a continuous, non-wound piece of conductive material.

18. The method of claim 9, wherein no portion of the conductive element crosses over or under another portion of the conductive element.

19. The method of claim 9, further comprising the step of plating the multi-thickness sheet or the multi-thickness template with a layer of nickel or a layer of tin.

* * * * *